United States Patent
Hayakawa et al.

[11] Patent Number: 5,615,291
[45] Date of Patent: Mar. 25, 1997

[54] CAPILLARY FOR OPTICAL FIBER CONNECTORS AND METHOD OF MANUFACTURING THE SAME

[75] Inventors: Makoto Hayakawa; Osamu Kobayashi; Takeshi Yamauchi, all of Kitakyusyu, Japan

[73] Assignee: Toto Ltd., Fukuoka, Japan

[21] Appl. No.: 619,553

[22] PCT Filed: Sep. 22, 1994

[86] PCT No.: PCT/JP94/01562

§ 371 Date: Jul. 1, 1996

§ 102(e) Date: Jul. 1, 1996

[87] PCT Pub. No.: WO95/09373

PCT Pub. Date: Apr. 6, 1995

[30] Foreign Application Priority Data

Sep. 27, 1993 [JP] Japan ............................ 5-239590
Jan. 27, 1994 [JP] Japan ............................ 6-007806
Jun. 9, 1994 [JP] Japan ............................ 6-150595

[51] Int. Cl.$^6$ ........................... G02B 6/36; C03B 18/00; B29D 11/00
[52] U.S. Cl. ................. 385/84; 385/66; 385/68; 385/77; 65/404; 264/1.21; 264/1.24; 264/56
[58] Field of Search .................. 385/60, 66, 68, 385/70, 76, 77, 78, 84, 85; 65/385, 404; 264/1.1, 1.21, 1.24, 2.1, 2.2, 2.3, 2.5, 2.7, 56, 63, 513

[56] References Cited

U.S. PATENT DOCUMENTS

| | | |
|---|---|---|
| 4,080,044 | 3/1978 | Gousseau ........................ 385/68 X |
| 4,479,910 | 10/1984 | Kurokawa et al. .................. 264/2.5 |
| 4,634,214 | 1/1987 | Cannon, Jr. et al. ............. 385/84 X |
| 4,743,084 | 5/1988 | Manning ........................ 385/84 X |
| 4,850,670 | 7/1989 | Mathis et al. .................. 385/68 X |
| 4,931,120 | 6/1990 | Christoff ...................... 385/84 X |
| 5,029,966 | 7/1991 | Serapins et al. ................ 385/84 X |
| 5,152,816 | 10/1992 | Berkey ......................... 385/84 X |
| 5,185,838 | 2/1993 | Luottgert et al. ............... 385/84 X |

FOREIGN PATENT DOCUMENTS

| | | | |
|---|---|---|---|
| 56-40510 | 9/1981 | Japan | 385/84 X |
| 58-9115 | 1/1983 | Japan | 385/84 X |
| 62-106419 | 5/1987 | Japan | 385/84 X |
| 3-208 | 7/1991 | Japan | 385/53 X |

*Primary Examiner*—Brian Healy
*Attorney, Agent, or Firm*—Jones, Day, Reavis & Pogue

[57] ABSTRACT

A capillary for an optical fiber connector which is low in machining cost and a process for producing the same is provided. The capillary for an optical fiber connector of the present invention comprises a cylindrical ceramics sintered body, and having a straight-hole like narrow hole 3 with a slightly larger inner diameter than an outer diameter of the optical fiber bare line for passing the bare line of the optical fiber therethrough, and a tip surface for connection at which the narrow hole opens; and an inner surface of the narrow hole being substantially a sintered surface. Therefore, a number of steps of grinding of the inner surface of the narrow hole is markedly reduced thin the conventional capillary for an optical fiber connector so that production cost can be reduced to a low amount.

3 Claims, 12 Drawing Sheets

Length of small diameter straight tube portion 10.5mm
Number of samples n=10

CAPILLARY FOR OPTICAL FIBER CONNECTORS AND METHOD OF MANUFACTURING THE SAME

UTILIZABLE FIELD IN THE INDUSTRY

The present invention relates to a capillary for an optical fiber connector to be used for an optical connector for transmitting an optical signal between optical fibers wherein tip surfaces of two optical fibers are confronted with each other.

PRIOR ART

An optical fiber connector is an article to connect optical fibers so that optical signals are transmitted well between optical fibers by precisely confronting tip surfaces of two optical fibers.

FIG. 17 is a sectional view showing schematic structure of a representative optical connector presently used. The optical connector 100 connects left and right fiber optics cables 101 and 101' of the figure.

In the fiber optics cables 101 and 101", optical fibers 102 and 102' are passed through. The optical fibers 102 and 102' are peeled off from the fiber optics cables 101 and 101' and inserted through a narrow hole 105 at the center of a capillary 104 in the optical connector 100 and fixed with an adhesive. The capillaries 104 and 104' are set in a sleeve 106 by confronting with each other to the axial direction. Both capillaries 104 and 104' are connected at their tip surfaces at substantially the center in the sleeve 106 (capillary contacting tip surface 108, machined to spherical or plane surface). At the contacting tip surfaces of the capillary, optical fibers 102 and 102' should be closely contacted with each other substantially without axial deviation or angle deviation. Said contacting tip surfaces are previously polished when manufacturing a capillary to adjust the shape of the tip surfaces, and finally, it is integrally polished with an optical fiber on-site and then assembled. Thus, optical signals can be passed through both optical fibers substantially without attenuation nor reflection. Incidentally, flanges 107 and 107' at the both ends of the optical connector 100 are fixed to fiber optics cables 101 and 101' by an adhesive and inserted into a housing mating portion via a click, and the housing mating portion is connected with a sleeve 106 (not shown) by a screw, a bionet lock, a push-on lock, etc. Therefore, a force worked between fiber optics cables 101 and 101' is transferred from flanges 107 and 107' to the sleeve 106, and no force is applied to optical fibers 102.

An example of the size of respective portions of the optical connector 100 is as follows.

① Optical fiber: diameter 125 μm

② Capillary: Outer diameter 2.5 mm, length 10.5 mm Inner diameter 126 μm

Characteristics required for a material for such an optical connector capillary are as follows.

① Optical fiber is easily passed through narrow hole.

② The material may be machined with good precision. Particularly, precision of inner and outer diameter of narrow hole, straightness and concentricity of the narrow hole and the outer peripheral surface can be made with good precision.

③ Toughness is a certain degree or more. Even when erroneously dropped at connector assembling or connecting operation, or impact is applied thereto, not broken.

④ In contract to the coefficient of thermal expansion $5 \times 10^{-6}$ °C. of the optical fiber, the coefficient of thermal expansion of the material is not so far therefrom. If the optical fiber recedes in or projects out of the narrow hole of the capillary due to temperature change, it becomes loss in optical signal transmission.

As the materials for a capillary of optical fiber which is required for such characteristics, a ceramic sintered body has widely been used. The reason can be considered that it is excellent in the following points as compared with metal and plastics.

① Since plastic deformation is hardly occurred, no deformation nor burr during machining is occurred so that machining can be carried out precisely. Also, when capillaries are butted, they are not deformed by butting pressure.

② It has good conformability with a fiber mainly composed of a glass and a fiber can be easily inserted even when clearance of an inner diameter of the capillary and an outer diameter of the fiber is 1 μm or less.

③ Difference in thermal expansion from the fiber is little and it is excellent in heat resistance so that it is durable against change in thermal circumstance.

④ It is excellent in wear resistance so that contamination at the tip surface due to wear powder is hardly occurred and connection failure is seldom generated at repeated connecting-and-releasing of a connector.

As for the shape or materials of a capillary for an optical fiber connector and a process for producing the same, many numbers of patent applications have been filed. For example, in Japanese Patent Publication No. Hei. 1-45042, a process for producing a capillary for an optical fiber connector which contains the steps of forming an original shape of a capillary by sintering a cylindrical molded material comprising alumina, etc. as a main component to which a primary hole is made for inserting an optical fiber stock line at the center thereof, and after sintering, a wire is passed through the primary hole of the capillary whereby polishing the primary hole by a diamond paste, etc. attached onto the surface of the wire.

In Japanese Provisional (Unexamined) Patent Publication No. Hei. 1-262507, there is disclosed a capillary for an optical fiber connector which comprises, in an optical fiber connector provided by a pair of ferrules (capillaries) tip portions of optical fibers are each to be fixed, a sleeve at which these ferrules are inserted and butted, and a means for applying a butting pressure to these ferrules to the axial direction; the butted tip surface of said ferrules being made convex spherical surface with curvature radius of 10 mm to 25 mm on the longitudinal axis of said ferrules as a center. Also, there is disclosed that the ferrule (capillary) is constituted by a zirconia ceramics.

In Japanese Provisional (Unexamined) Patent Publication No. Hei. 2-304508, there is disclosed a connector for an optical fiber which comprises, in a connector for an optical fiber wherein an optical fiber is fitted to an axial hole provided along the center of a ceramic ferrule (capillary), and optical fiber are connected by butting tip surfaces of the ceramic ferrules for connection; said axial hole being constituted by a straight tube portion in which an inner diameter is constant to the axial direction and a tapered tube portion which spreads out toward the inserting tip surface side into which an optical fiber is inserted.

As the process for producing such a ceramics capillary, an extrusion forming method, injection molding method or powder pressing method can be considered. However, in the case of the extrusion forming method, only a straight tube can be produced so that a tapered portion must be formed by machining. When such a post-machining is to be carried out, operation should proceed carefully so as to not leave a machining flaw. This is because when a machining flaw is generated, there is a fear of damaging or breaking a fiber by contacting with the portion. Therefore, the extrusion forming method is expensive in machining cost so that it cannot be said that it is suitable for the process for producing a capillary. In this point, the injection molding method and the powder pressing method are preferred since a tapered portion can be formed simultaneously. Among these, the injection molding method which gives good dimensional accuracy of the resulting sintered body is most preferred.

FIG. 18 is a sectional view of one example of the conventional mold for injection molding. At the first mold 111, a cavity 112 for a capillary is provided by cutting. Also, at the second mold 113, a tapered portion 114 and a needle 115 are projectingly provided, and a gate 116 is provided. The second mold 113 is matched to the first mold 111, and at this time, a tip of the needle 115 is introduced into a concave portion 111a of the first mold 111. In this state, ceramics powder containing a binder is injected into the cavity 112 with a high pressure through the gate 116.

Task to be Solved by the Invention

When the injection molded ceramic capillary was cut, it was found that a narrow hole portion formed by the needle 115 was not completely linear but slightly curved. This is because, as shown in FIG. 18 with an imaginary line, the needle 115 bent. That is, the needle 115 is extremely thin and little in flexural rigidity, and an injected compound is not with complete uniformity spread to the circumferential surface of the needle 115 so that it can be estimated that the needle bent around the center portion to the lengthwise direction of the needle 115.

Bending at the narrow hole portion can be allowed with a some extent but as for the portion exceeding the allowable range, it is necessary to correct the bending by applying "hole machining". The diameter of the narrow hole portion is regulated to a uniform value in the finished product after sintering so that when the hole machining is carried out, it is necessary to expect a margin of cutting. If it is the case, the diameter of the narrow hole portion of the molded material becomes small with the amount of the margin of cutting and at the same time, the needle 115 becomes also thin. Since a thin needle becomes further thin, there occurs the vicious circle of further increasing the above bending and deflection whereby a countermeasure thereto is required. Even in the powder pressing method, it is difficult to apply the pressing pressure to the needle with complete uniformity so that the same problem exists.

Also, when the hole machining is applied to, an edge is likely formed at the border of the tapered portion (103 in FIG. 17) and the narrow hole portion (105 of the same figure) so that there is a fear that the edge will likely damage the fiber bare line to be introduced. Therefore, the hole machining is not easy and causes increase in production costs.

After all, in the conventional capillary for an optical fiber connector and a process for preparing the same, the following problems are involved.

① Narrow hole machining is essential and the cost is increased for doing the machining.

② An edge (machining burr) is likely formed at the cross portion of the narrow hole and the tapered hole portion so that there are fear that a fiber is broken or damaged when introducing the fiber.

An object of the present invention is to provide a capillary for an optical fiber connector and a process for producing the same with a low machining cost.

Means for Solving the Task

A capillary for an optical fiber connector of the first embodiment according to the present invention comprises, in a capillary used for an optical connector in which tip surfaces of two optical fiber are butted to transmit optical signals between both optical fiber; a cylindrical ceramics sintered body, having a straight-hole like narrow hole with a slightly larger inner diameter than an outer diameter of said optical fiber bare line For passing the bare line of the optical fiber therethrough, and a tip surface for connection at which the narrow hole opens; and an inner surface of said narrow hole being substantially a sintered surface.

A capillary for an optical fiber connector of the second embodiment according to the present invention comprises, in a capillary comprising a cylindrical ceramics sintered body which is used for an optical connector in which tip surfaces of two optical fibers are butted to transmit optical signals between both optical fibers; having a straight-hole like narrow hole with a slightly larger inner diameter than an outer diameter of said optical fiber bare line for passing the bare line of the optical fiber therethrough, a tip surface for connection at which the narrow hole opens, a tapered hole portion which elongates gradually tapering and positioned at an opposite side of the tip surface for connection of the narrow hole on the same axis as the narrow hole, and a straight-hole like large hole which is connected with the tapered hole portion on the same axis and for inserting an optical fiber core line therethrough; and an inner surface of said narrow hole being substantially a sintered surface.

Action

The capillaries for an optical fiber connector of the above two embodiments according to the present invention each have a narrow hole substantially a sintered surface so that number of steps for grinding is markedly reduced as compared to the conventional capillary for an optical fiber connector. Thus, a manufacturing cost can be depressed to a low amount. Also, at the grinding of the narrow hole, an edge which may be formed at the cross portion of the narrow hole portion and the tapered portion, etc. is not generated. Therefore, damage of a fiber caused by the edge can be prevented. Here, the narrow hole of the capillary is substantially a sintered surface means that remarkable narrow hole machining (machining margin of 5 μm or more) through which the conventional bending is retouched is not carried out. Therefore, it is the meanings that in addition to the complete sintered surface, a surface to which a slightly retouching grinding is applied of such a degree that adhered ceramic powder is removed or a surface to which blast machining is applied with free abrasive grains is included.

In the capillary for an optical fiber connector of the present invention, a molded body for a ceramics sintered body which constitutes the aforesaid capillary may be obtained by injection molding a mixture of ceramics powder and a binder.

This is because a capillary formed by an injection molding easily gives a sintered body having good dimensional accuracy and surface accuracy than a capillary formed by an extrusion or powder pressing.

In the capillary for an optical fiber connector of the present invention, it is preferred that the aforesaid optical fiber is a single mode optical fiber, the aforesaid narrow hole diameter $d_c$ is 125 μm$\leq d_c \leq$127 μm, and the aforesaid narrow hole length of 1.2 to 8.5 mm. As described in detail below, it is suitable for making a connector transmission loss (connection loss) of optical signals little by making an oblique angle (inclination) of an axis of an inserted fiber to an axis of the capillary 0.1° or less.

Further, in order to ensure the fiber oblique angle of 0.05° or less under the above conditions, the above narrow hole length is preferably 2.3 to 6.1 mm.

In the capillary for an optical fiber connector of the present invention, it is preferred that the aforesaid optical fiber is a multi mode optical fiber, the aforesaid narrow hole diameter $d_c$ is 126 µm≦$d_c$≦128 µm, and the aforesaid narrow hole length of 0.9 mm or more. Further, the narrow hole length in this case is more preferably 1.7 to 8.5 mm. The reason is that in the multi mode optical fiber, a value allowable as a connection loss is larger than that of the single mode. In general, while the maximum value of the connection loss allowable in the single mode is less than 0.5 dB, it may be less than 1 dB in the multi mode. Therefore, as for the fiber oblique angle, a wide tolerance is allowed in the multi mode, and it is to be ensured a value of 0.2° or less, preferably 0.1° or less. The value of 0.9 mm or more is a value which can ensure the oblique angle of 0.2° or less, and the range of 1.7 to 8.5 mm is a value which can ensure the oblique angle of 0.1° or less.

In the capillary for an optical fiber connector of the present invention, it is preferred that the aforesaid optical fiber is a multi mode optical fiber, the aforesaid narrow hole diameter dc is 128 µm≦$d_c$<130 µm, and the aforesaid narrow hole length of 1.4 mm or more. Further, the narrow hole length in this case is more preferably 2.9 to 7.5 mm. This is the same reasons as the reasons mentioned above.

In the capillary for an optical fiber connector of the present invention, it is preferred that the aforesaid optical fiber is a multi mode optical fiber, the aforesaid narrow hole diameter $d_c$ is 130 µm≦$d_c$≦132 µm, and the aforesaid narrow hole length of 2 mm or more. Further, the narrow hole length in this case is more preferably 4 to 6.1 mm. This is the same reasons as the reasons mentioned above.

In the capillary for an optical fiber connector of the second embodiment according to the present invention, it is preferred that the sum of the aforesaid narrow hole length and the aforesaid tapered hole portion length is 5 mm to 8.5 mm. This is because when the adhering method and an adhesive for the capillary and the optical fiber presently used are employed, good heat-cold-impact characteristics (mentioned hereinbelow) can be obtained in the above range.

Further, the sum of the aforesaid narrow hole length and the aforesaid tapered hole portion length is more preferably 5.5 mm to 8.5 mm, and said length is most preferably 6 to 8.5 mm. This is because a safety factor against an instability factor (slight degree work failure) at connecting work of optical fiber becomes high.

In the capillary for an optical fiber connector of the second embodiment according to the present invention, it is preferred that the aforesaid large hole length of 2 mm or more. The large hole portion is a portion which is to be adhered to the fiber core line, and adhesive strength of both can be maintained with a high degree whereby impact resistance becomes good.

In the capillary for an optical fiber connector of the second embodiment according to the present invention, it is preferred that the aforesaid tapered hole portion is also a sintered surface and the border portion of the narrow hole and the tapered hole portion is a smooth surface without machining burr (edge). This is because when the fiber is to be introduced into the capillary, operation is easy and damage of the fiber bare line can be prevented.

In the capillary for an optical fiber connector according to the present invention, it is preferred that an oblique angle ($θ_{max}$) to the capillary axis of a narrow hole opened to the tip surface for connection is 0.1° or less in the single mode and 0.2° or less in the multi mode. This is because connection loss of optical signals at the connector can be reduced to a low degree.

In the capillary for an optical fiber connector according to the present invention, it is preferred that the aforesaid inner surface roughness of the narrow hole is $R_a$=0.1 µm or less. This is because the fiber bare line can be introduced smoothly into the capillary, and also damage of the introduced fiber bare line can be prevented so that lowering in strength of the bare line can be prevented.

In the capillary for an optical fiber connector according to the present invention, it is preferred that the aforesaid ceramics sintered body is a zirconia series sintered body and crystal grain size at the inner surface of the aforesaid narrow hole of 0.5 µm or less. Further, the above crystal grain size is more preferably 0.3 µm or less.

The zirconia sintered body has high toughness and hardly broken. Those having a fine crystal grain size are advantageous in the point of making the surface roughness of the narrow hole small. Further, it is advantageous for preventing generation of cracks at cooling after sintering or increasing hardness of the sintered body.

In the capillary for an optical fiber connector according to the present invention, it is preferred that an opening angle of the aforesaid tapered hole portion is 10° to 20°. This is because the fiber bare line can be easily introduced into the capillary and it is advantageous for preventing damage of the fiber bare line.

In the same view, the above opening angle is more preferably 12° to 18°. Further, said angle is most preferably 14° to 16°.

The process for producing a capillary for an optical fiber connector according to the present invention is a process for producing a capillary for an optical fiber connector comprising a ceramics sintered body provided by a straight-hole like narrow hole for inserting an optical fiber bare line therethrough; which comprises an injection molding step for obtaining a molded body by subjecting a mixture (compound) of ceramics powder and a binder to an injection molding into a mold provided by a molding pin for forming the above narrow hole, a degreasing step for removing the binder from the molded body, and a sintering step of sintering the degreased molded body to obtain a sintered body; and the above molding pin has a diameter d" determined by the formula: d"=$d_c$/(s·z) from a diameter of the above narrow hole $d_c$, a sintering shrinkage factor s, and a shrinkage factor z at cooling solidification of the molded body.

In the process for producing a capillary for an optical fiber connector according to the present invention, in order to control a discrepancy of an angle of the narrow hole due to bending of the above molding pin at the injection molding to a predetermined value, a narrow hole length L may be determined according to the following formula.

① In the case of the single mode;
L≧1800($d_c$−$d_f$)/π and
L≦(tan 0.1°×d"$^4$E/6.79w)$^{1/3}$/sz ② In the case of the multi mode;
L≧900 ($d_c$−$d_f$)/π and
L≦(tan 0.2°×d"$^4$E/6.79w)$^{1/3}$/sz $d_c$: Narrow hole diameter
$d_f$: Bare line diameter
d": Molding pin diameter, d"=$d_c$/sz
E: Young's modulus of the molding pin
w: Lateral load acted on the pin at an injection molding s: Sintering shrinkage factor
z: Molding shrinkage factor A possible maximum oblique angle $\theta_{max}$ of an axis of the fiber bare line against an axis of the capillary at the tip surface for connection (hereinafter abbreviated merely to as bare line oblique angle) is represented by the following formula.

$$\theta_{max} = \alpha_{max} + \beta_{max} \quad (1)$$

$\alpha_{max}$: Possible maximum oblique angle for narrow hole axis $\beta_{max}$: Possible maximum oblique angle against narrow hole axis of the bare line axis Here, $\alpha$ may be considered to be a deflection angle of the molding pin of the mold at an injection molding, the angle being inclination of the narrow hole axis as such. In such a case, $\alpha_{max}$ is considered to be a one end supported and another end fixed beam (see FIG. 3) and shown by the following formula. (see "Mechanical Engineering Handbook, Modified 5th Edition", page 47)

$$\alpha_{max} = \tan^{-1}(wL''^3/48EI) \quad (2)$$

w: Lateral direction distribution load acted on the molding pin at an injection molding, it is considered to be uniform distribution load.

L'': Length of narrow hole corresponding portion of the molding pin

E: Young's modulus of the molding pin constituting material

I: Geometrical moment of inertia of the molding pin

The molding pin has a circular sectional surface with a diameter d'' so that it becomes as follows.

$$I = \pi d''^4/1024 \quad (3)$$

Formula (3) is substituted for Formula (2) as follows.

$$\alpha_{max} = \tan^{-1}(679wL''^3/d''^4E) \quad (4)$$

Here, an example of a method for obtaining the value of w (distribution load) is explained.

The maximum deflection $y''_{max}$ of the molding pin is as follows under the same conditions as the above deflection angle was obtained.

$$y''_{max} = wL''^4/184.6EI = 1.77wL''^4/d''^4E \quad (5)$$

Also, $y''_{max}$ is as follows from deflection $y_{max}$ in the capillary real product (sintered body).

$$y''_{max} = y_{max}/(s \cdot z) \quad (6)$$

s: Sintering shrinkage factor
z: Linear shrinkage factor at cooling·solidification of the sintered body From (5) and (6), the following is led.

$$w = y''_{max} d''^4 E/1.77L''^4 = y_{max} d''^4 E/(1.77L''^4 SZ) \quad (7)$$

Here, when the data for y, s and z are obtained with respective predetermined conditions, w can be estimated. If so, $\alpha_{max}$ can be estimated from Formula (4).

On the other hand, when $\alpha_{max}$ is geometrically considered (see FIG. 4), it is as follows.

$$\beta_{max} = \tan^{-1}\{(d_c - d_f)/L\} \approx 180(d_c - d_f)/(\pi L) \quad (8)$$

$d_c$: Narrow hole diameter $d_f$: Bare line diameter
L: Narrow hole length

From Formulae (1), (4) and (8), it is as follows.

$$\theta_{max} = \alpha_{max} + \beta_{max} = \tan^{-1}(6.79wL''^3/d''^4E) + 180(d_c - d_f)/(\pi L) \quad (9)$$

Here, in the case where L (L'') is short, the second term of the right side becomes predominant, while in the case where L (L'') is long, the first term of the right side becomes predominant so that the following can be considered. This is because $\alpha$ is proportional to the cube of L''.

① In the case of the single mode;
As for the lower limit value of L:

$$\theta_{max} \approx 180(d_c - d_f)/(\pi L) \leq 0.1° \text{ Therefore, } L \geq 1800(d_c - d_f)/\pi \quad (10)$$

As for the upper limit of L:

$$\theta_{max} \approx \tan^{-1}(6.79WL''^3/d''^4E) \leq 0.1° \text{ Therefore, } L = L''/(sz) \leq (\tan 0.1° \times d''^4 E/6.79w)^{1/3}/(sz) \quad (11)$$

② In the case of the multi mode;
As for the lower limit value of L:

$$\theta_{max} \approx 180(d_c - d_f)/(\pi L) \leq 0.2° \text{ Therefore, } L \geq 900(d_c - d_f)/\pi \quad (12)$$

As for the upper limit of L:

$$\theta_{max} \approx \tan^{-1}(6.79WL''^3/d''^4E) \leq 0.2° \text{ Therefore, } L = L''/(sz) \leq (\tan 0.2° \times d''^4 E/6.79w)^{1/3}/(sz) \quad (13)$$

Incidentally, $\theta_{max} \leq 0.1°$ or $0.2°$ is one example. Based on the above formulae, as for specific calculation results in the case corresponding to Claims 4 to 11, they are described in the part of Examples.

In the process for producing a capillary for an optical fiber connector according to the present invention, in order to estimate a discrepancy of an angle of the narrow hole due to bending of the above molding pin at the injection molding and control the discrepancy of the angle to a predetermined value or less, a viscosity of the compound for injection molding in a mold cavity may be controlled to a suitable value.

Also, in the process for producing a capillary for an optical fiber connector according to the present invention, in order to estimate a discrepancy of an angle of the narrow hole due to bending of the above molding pin at the injection molding and control the discrepancy of the angle to a predetermined value or less, an injection speed may be controlled to a suitable value. Incidentally, an improvement of a mold such as the sum of a sprue length from a top end of the sprue to a manufacturing portion and a runner length, a ratio of the diameter of the runner portion and a thickness of a film gate, etc. provides an effect directly to the viscosity and the injection molding speed, thereby mold bending is controlled so that it would be needless to say that they are belonging to this category.

In the above estimating formula (9) of $\theta_{max}$, w (lateral load of a molding pin) is affected by a viscosity or injection speed of the compound. Accordingly, even after determining the size of the molding pin, a discrepancy of an angle ($\alpha_{max}$) of the narrow hole can be controlled to a regulated value or less by controlling the viscosity or injection speed of the compound.

In the process for producing a capillary for an optical fiber connector according to the present invention, the injection molding may be carried out under the conditions satisfying the following formulae.

① In the case of the single mode;

$$\tan^{-1} [6.79L^3s^3z^3 \times \exp\{-A \log \eta + B\}/(d_c^4 E)] + 180(d_c - d_f)/(\pi L) \leq 0.1 \quad (14)$$

② In the case of the multi mode;

$$\tan^{-1} [6.79L^3s^3z^3 \times \exp\{-A \log \eta + B\}/(d_c^4 E)] + 180(d_c - d_f)/(\pi L) \leq 0.2 \quad (15)$$

A: Constant
η: Apparent viscosity value of the compound
B: Constant

It has been found that between the lateral load w acting on the molding pin at injection molding and an apparent viscosity value η of the compound, the following relationship exists.

$$w = \exp\{-A \log \eta + B\} \quad (16)$$

A: Constant, one example 0.46
B: Constant, one example 2.81

That is, in the element of the above one example, when the apparent viscosity value of the compound is made high, w becomes small. The fact that w becomes small means that bending of the molding pin at the injection molding also becomes small. Accordingly, when the parameters of Formulae (14) and (15) including η are controlled, a capillary having a small oblique angle (that is, an oblique angle of the fiber bare line is small) of the narrow hole can be produced.

In the process for producing a capillary for an optical fiber connector according to the present invention, it is preferred that the volume ratio of the ceramics powder in the above compound for injection molding is 30 to 70%. If the volume ratio of the ceramics powder is too low, holes are likely formed in the molded body and sintered body so that a surface roughness at the inner surface of the narrow hole becomes rough. Also, a time required for degreasing of the molded body becomes long. Further, stability of the shrinkage factor becomes poor so that dimensional accuracy of the sintered body becomes poor.

If the volume ratio of the ceramics powder is too high, the compound does not flow smoothly at injection molding so that surface roughening (that is, surface roughening of the sintered body) of the molded body occurs. Therefore, the above-mentioned range is preferred. For stability of production, the volume ratio of the ceramics powder is more preferably 40 to 60%.

Table 1 is a graph summarized evaluations of molded bodys having various binder compositions. The ceramics powder ($ZrO_2$, grain diameter 0.3 μm) is mixed by a volume ratio shown at the left column of the table. As can be seen from the table, by using a polystyrene series, acrylic series and wax series binders, satisfactory results are obtained within the range of the ceramics powder volume ratio of 30 to 70%. With an acrylic series binder, a compound using the ceramics powder volume ratio of 40 or 60% is used, particularly good molded body was obtained.

TABLE 1

Evaluation of molded body with various compound compositions
(ceramics = $ZrO_2$, grain diameter 0.3 μm)

| x | Binder | Hole | Degreasing property | Shrinkage stability | Surface roughening |
|---|---|---|---|---|---|
| 20 | Polystyrene series | X | X | X | O |
| 20 | Acrylic series | X | X | Δ | O |
| 30 | Polystyrene series | Δ | Δ | Δ | O |
| 30 | Acrylic series | Δ | Δ | O | O |
| 40 | Acrylic series | O | O | O | O |
| 60 | Acrylic series | O | O | O | O |
| 70 | Acrylic series | O | O | O | Δ |
| 70 | Wax series | O | Δ | O | O |
| 80 | Acrylic series | O | O | O | X |
| 80 | Wax series | O | Δ | O | X |

O: Good, Δ: Normal, X: Poor

In the process for producing a capillary for an optical fiber connector according to the present invention, it is preferred that the molding pin of the above injection molding mold is constituted by a high rigidity material (Young's modulus of $5 \times 10^4$ kg/mm$^2$ or more) containing WC. This is because bending of the molding pin at the injection molding can be made little. In the process for producing a capillary for an optical fiber connector according to the present invention, it is preferred that the above optical fiber is a multi mode optical fiber, and the diameter of the narrow hole portion of the above molding pin is 149 to 185 μm. Also, when it is the single mode one, the diameter of the narrow hole portion of the molding pin is preferably 147 to 178 μm.

When the shrinkage factor of the molded body is less than 2%, the volume ratio of the ceramics powder is 40 to 60% and a relative density of the sintered body is 100% (equal to the theoretical density), the diameter of the molding pin becomes as mentioned above. Incidentally, the narrow hole diameter of the capillary for the multi mode optical fiber is 127 to 132 μm and the narrow hole diameter of the capillary for the single mode optical fiber is 125.5 to 127 μm. Such a pin is thicker than the pin conventionally used (about 140 μm), and thus, bending of the pin at the injection molding can be made small.

In the process for producing a capillary for an optical fiber connector according to the present invention, it is preferred that a grain size of the above ceramics powder is 1 μm or less in average and a volume ratio of the ceramics powder is 30 to 70%. It is to ensure the characteristics of the molded body and the sintered body. Incidentally, the average diameter herein mentioned is a median diameter (a diameter in which a cumulative distribution of 50%). As a material of the ceramics powder, there may be used $Y_2O_3$ partially stabilized $ZrO_2$, $CeO_2$ partially stabilized $ZrO_2$ (an application by the same applicant, filed on Mar. 10, 1994, Reference No. 935513), $Al_2O_3$, etc.

In the process for producing a capillary for an optical fiber connector according to the present invention, it is preferred that a main component of the above binder is a high molecular weight compound having an average molecular weight of 10,000 or more. This is effective for heightening a viscosity of the compound. Examples of such a high molecular weight compound may include an acrylic series resin, a polystyrene series resin, etc. Among these, an acrylic series resin is particularly preferred since a shrinkage factor of the molded body is low and dimensional stability is good.

EXAMPLE

In the following, Examples of the present invention and Comparative examples are explained. First, Comparative example in accordance with a conventional capillary having no tapered portion which is on condition that narrow hole machining is to be carried out is firstly explained.

By the following conditions, a sintered body for a capillary of Comparative example was prepared.

Figure 2:
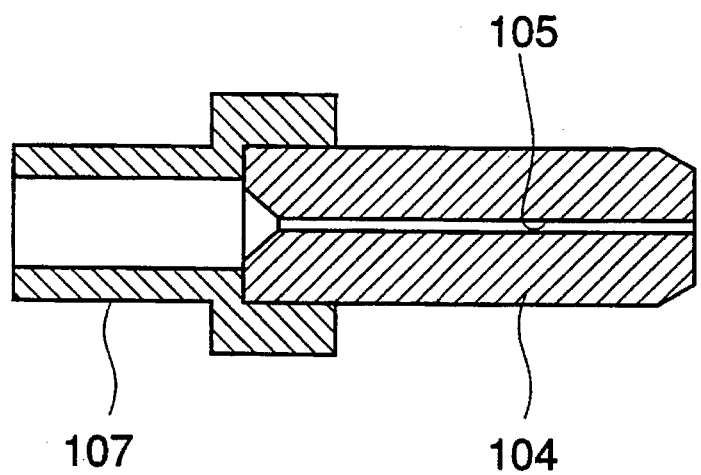
FIG. 2 A sectional view showing the conventional optical connector.
Figure 3:
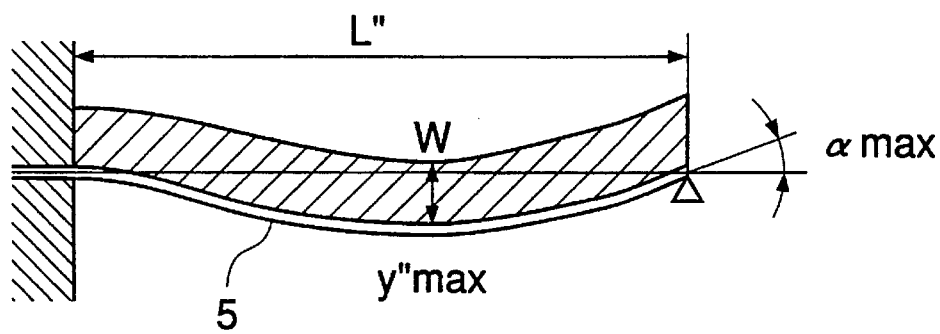
FIG. 3 A drawing showing deflection of a pin for a capillary injection molding.
Figure 4:
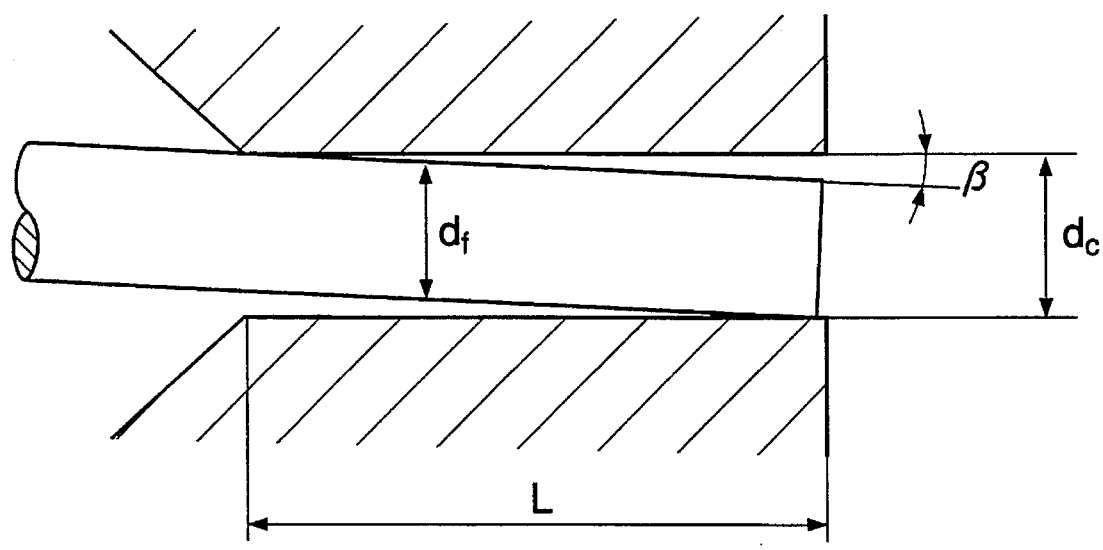
FIG. 4 A drawing showing an inclination of a narrow hole of a capillary and an optical fiber bare line.

Shape: shown in FIG. 2. Characteristic feature resides in that a narrow hole 105 is long (10 mm).

Preparation method: Injection molding'sintering

Ceramics powder volume ratio: 41%

Molding pin material: Cemented carbide

Compound viscosity: 1.1×105 (poise)

Narrow hole inner diameter is as follows by expecting a cutting margin of a grinding.

Sintered body narrow hole inner diameter: 100 μm

Molded body narrow hole inner diameter: 138 μm

Molding pin outer shape: 138 μm

Incidentally, a shrinkage parameter from the molded body to the sintered body is set 73%.

A length of a narrow hole is as follows.

Sintered body narrow hole length: 10.5 mm

Molded body narrow hole length: 14.5 mm

The maximum deflection ($y_{max}$) of a narrow hole of the sintered body for a capillary prepared by the above conditions was 27 μm. This data and a molding pin diameter d"=138 μm, Young's modulus of the pin E =5.31 x 10⁴ kg/mm², total shrinkage parameter sz=0.73 and L"=14.5 mm are put in Formula (7) to obtain a lateral load acted on the molding pin at injection molding w=1.1×10⁻⁴ kgf/mm.

Figure 6:
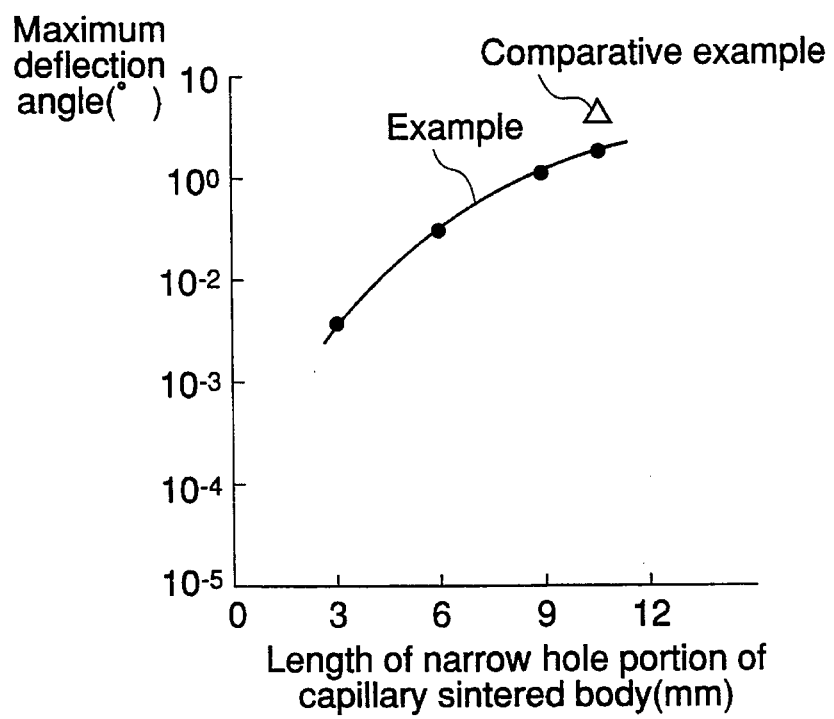
FIG. 6 A graph showing the relationship between a length of a narrow hole portion of a capillary sintered body and the maximum deflection angle.

Also, the above data are substituted for Formula (4) to obtain an oblique angle of the narrow hole is $\alpha_{max}$=0.42° (shown in FIG. 6 mentioned below with A.).

On the other hand, an oblique angle $\beta_{max}$ to the narrow hole of the fiber bare line is substituted the narrow hole diameter $d_c$=132 μm (multi mode maximum diameter), the fiber bare line diameter $d_f$=125 μm, L=10.5 mm for Formula (8) to obtain $\beta_{max}$=0.035°. Accordingly, angle discrepancy (an oblique angle to the capillary of the fiber bare line) of the fiber bare line $\theta_{max}$ is $$\theta_{max}=\alpha_{max}+\beta_{max}=0.42°+0.035°=0.45°.$$

The value of $\theta_{max}$ is a value far greater than the limit value 0.1° of the single mode and the limit value 0.2° of the multi mode and is markedly bad and out of discussion.

Next, a capillary which is on condition that narrow hole machining is not to be carried out is explained.

Figure 1:
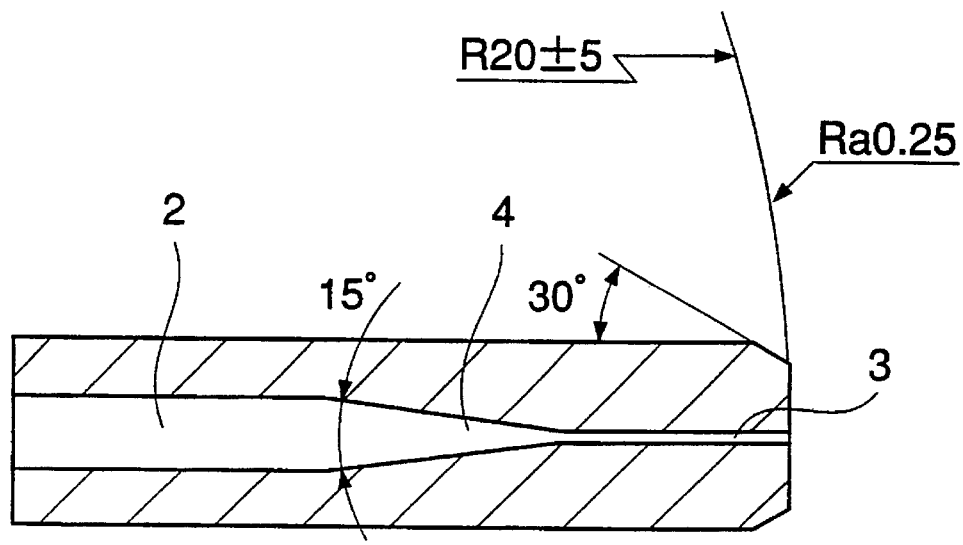
FIG. 1 A sectional view of the capillary in accordance with one example of the present invention.

Shape example: a shape example of a capillary with a type having a narrow hole 3, a tapered hole portion 4 and a large hole 2 is shown in FIG. 1.

Material, preparation method, etc.: They are made the same as the case of the conventional type as mentioned above except for not effecting a narrow hole machining.

Narrow hole inner diameter: The following four types were considered.

① Single 1: Sintered body $d_c$=127 μm, Molded body d"=174 μm

② Multi 1: Sintered body $d_c$=128 μm, Molded body d"=175 μm

③ Multi 2: Sintered body $d_c$=130 μm, Molded body d"=178 μm

④ Multi 3: Sintered body $d_c$=132 μm, Molded body d"=180 μm

Figure 5:
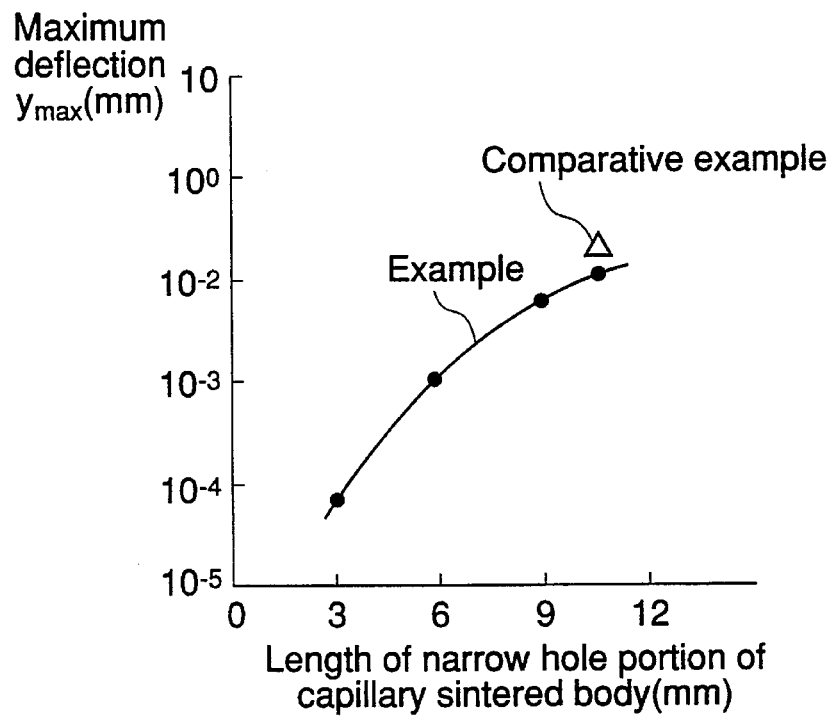
FIG. 5 A graph showing the relationship between a length of a narrow hole portion of a capillary sintered body and the maximum deflection.

FIG. 5 is a graph showing the relationship between a length of a narrow hole portion of a capillary sintered body and the maximum deflection, and according to the graph, it can be understood that when a length of the narrow hole portion of the capillary sintered body is small, deflection $y_{max}$ becomes small like an exponential function. Incidentally, Comparative example is additionally shown as A. On the other hand, FIG. 6 is a graph showing the relationship between a length of a narrow hole portion of a capillary sintered body and the maximum deflection angle, and according to this graph, it can be understood that when a length of the narrow hole portion of the capillary sintered body is small, deflection angle $\alpha_{max}$ becomes small like an exponential function.

Figure 7:
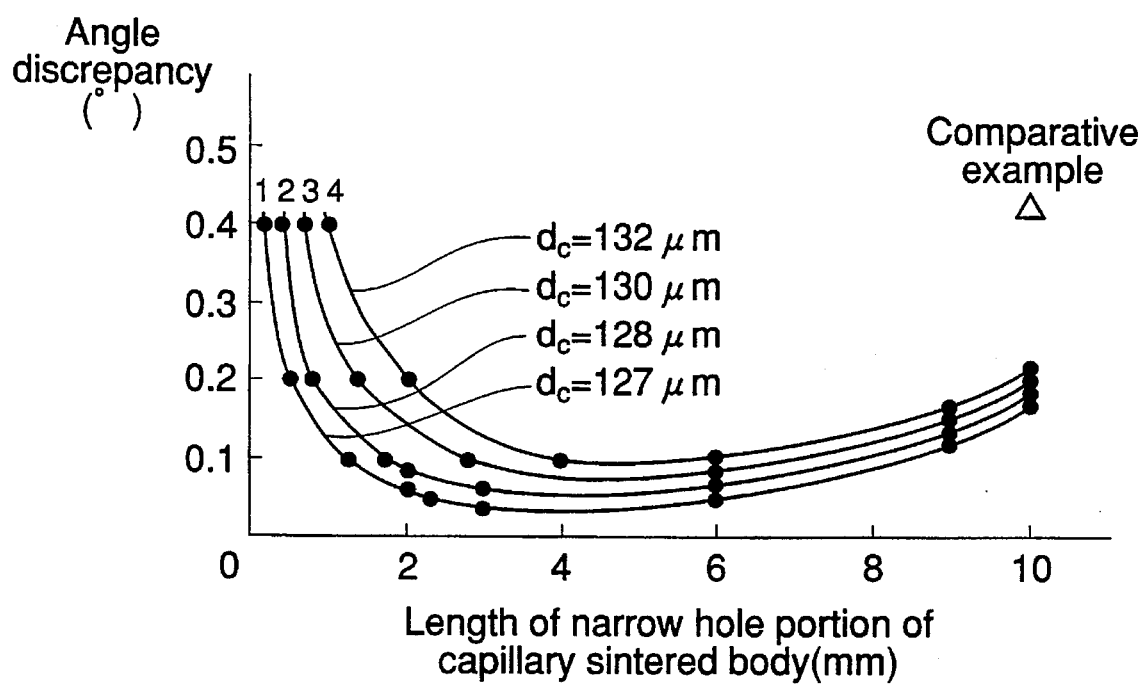
FIG. 7 A graph showing the relationship between a length of a narrow hole of a capillary sintered body and the maximum angle oblique $\theta_{max}$ of a fiber bare line.

FIG. 7 is a graph showing the relationship between a length of a narrow hole of a capillary sintered body and the maximum angle discrepancy $\theta_{max}$ of a fiber bare line. The angle discrepancy $\theta_{max}$ is $\theta_{max}$=narrow hole oblique angle $\alpha_{max}$+fiber bare line oblique angle $\beta_{max}$ and can be calculated by Formula (9).

The angle discrepancy $\theta_{max}$ is shown in the graph of FIG. 7 when w is made the aforesaid experimental value, $d_f$=125 μm and $d_c$=127, 128, 130 or 132 μm. ① is a representative example in the single mode $d_c$=125 to 127 μm, multi 1 of ② is a representative example at $d_c$=126 to 128 μm, multi 2 of ③ is a representative example at $d_c$=128 to 130 μm, and multi 3 of ④ is a representative example at $d_c$=130 to 132 μm.

The reason why the upper limit value is selected as a representative example, respectively, is that these are the most severe conditions. From Formula (8), the fiber bare line oblique angle $\beta_{max}$ is proportional to $(d_c-d_f)$. Since the fiber bare line diameter $d_f$≈125 μm, the larger $d_c$ is, the bigger the $\beta_{max}$ is. On the other hand, the angle discrepancy $\theta_{max}$ is shown by $\theta_{max}=\alpha_{max}+\beta_{max}$ as in Formula (9) so that when dc is larger, the angle discrepancy becomes remarkable and the conditions become severe. Incidentally, preferred relationship between the narrow hole inner diameter $d_c$ in which the upper limit value of the angle discrepancy is made 0.1° in the case of a single mode and 0.2° in the case of a multi mode, and further as a safety value, 0.05° in the case of a single mode and 0.1° in the case of a multi mode, and the narrow hole length L is as described above.

On the other hand, for determining the size of a hole of the capillary for an optical fiber connector, heat-cold-impact must also be considered.

Figure 17:
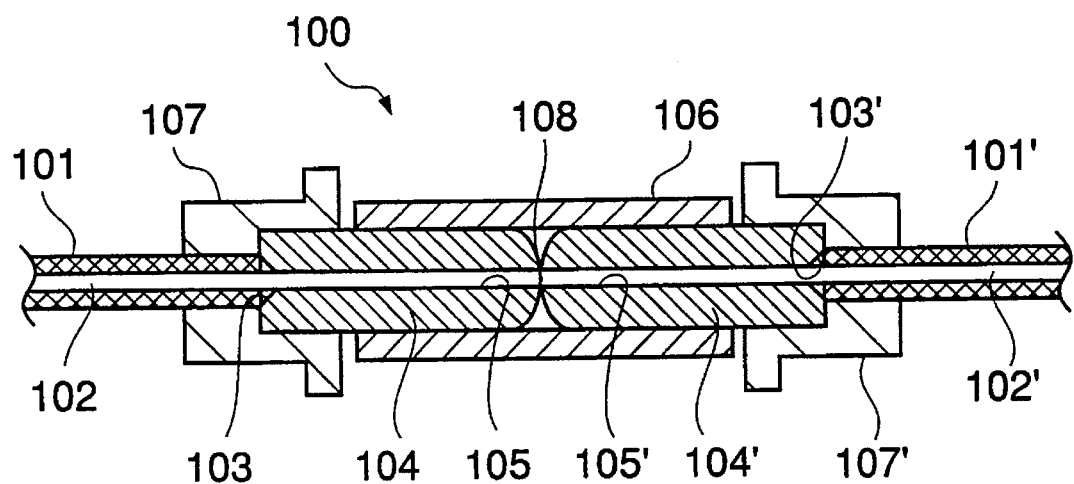
FIG. 17 A sectional view showing schematic structure of a representative optical connector presently used.
Figure 18:
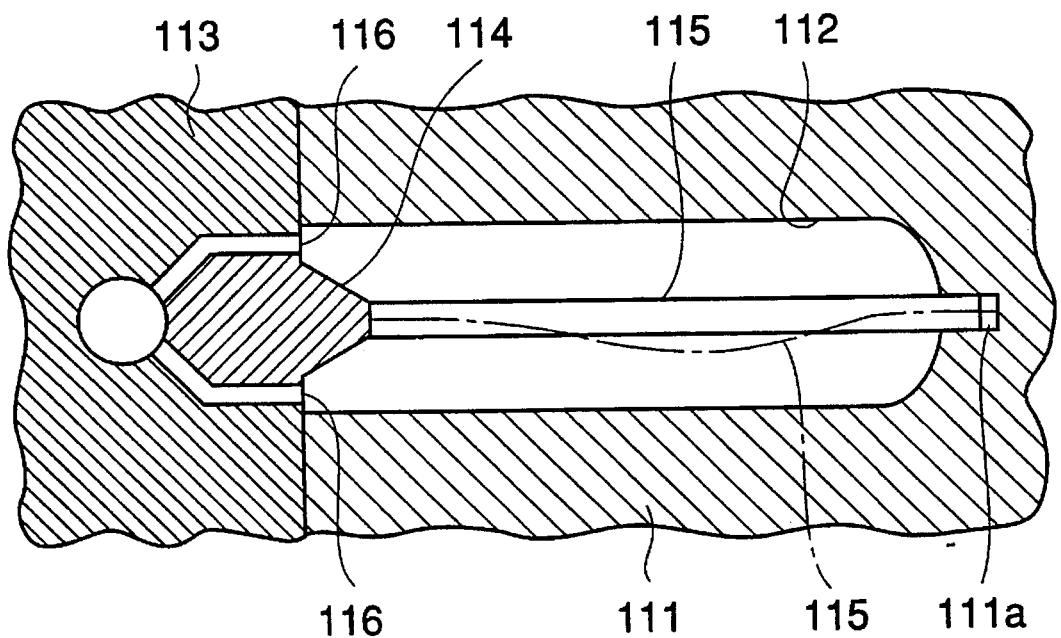
FIG. 18 A sectional view of a mold of one example of the conventional injection.

In the connector of Japanese Patent Publication No. Hei 1-45042 (see FIG. 17), the optical fiber core line 101 is supported only by a flange 107, but in such a structure, it cannot be said that it can sufficiently endure heat-cold-impact (applying heating, cooling and impact repeatedly). Concrete example is explained in the following.

Figure 8:
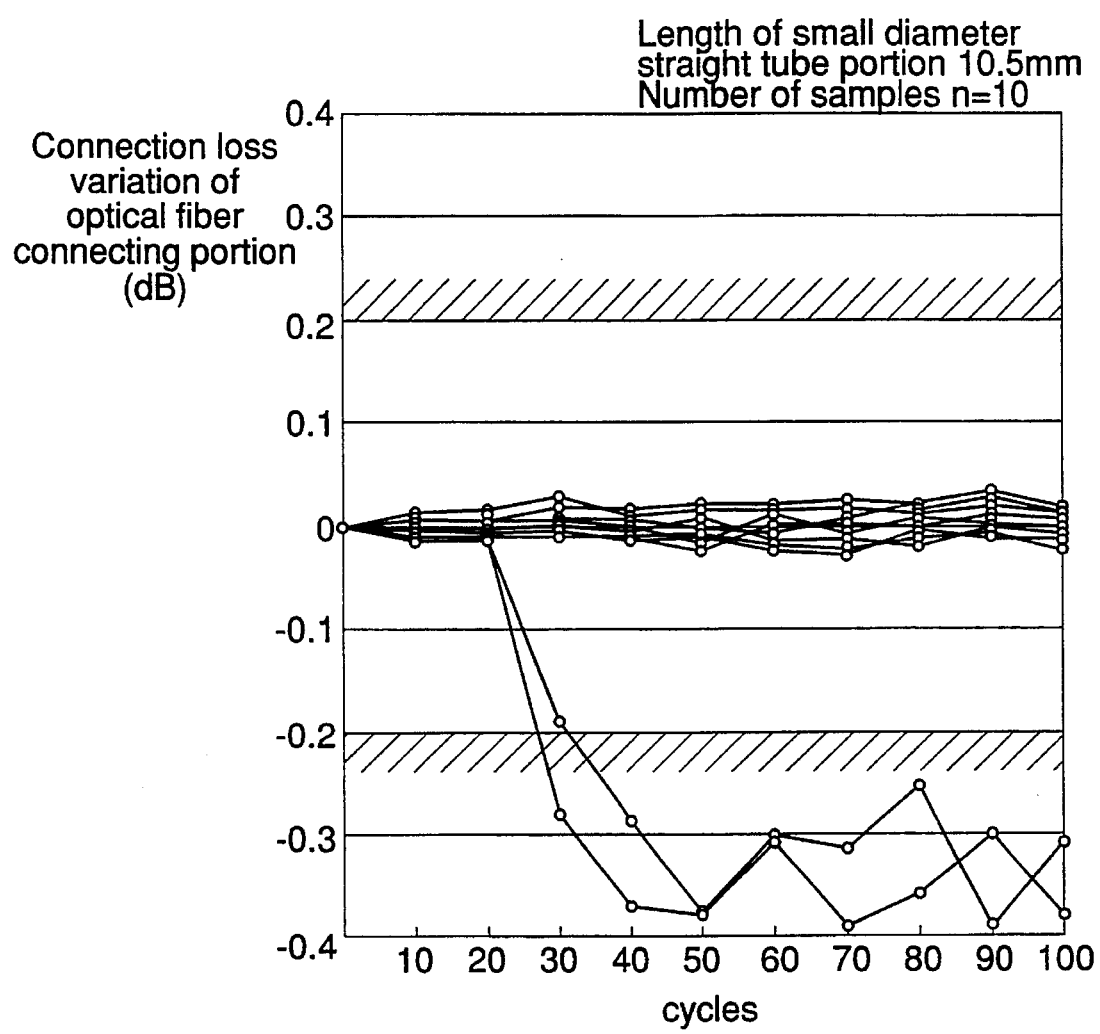
FIG. 8 A graph showing a variation of connection loss at an optical fiber connecting portion prepared by using the conventional ferrule.

FIG. 8 is a graph showing a variation of connection loss at an optical fiber connecting portion prepared by using the conventional ferrule, and the transverse axis shows a number of heat-cold-impact cycles and the ordinates axis shows the variation of the connection loss. Preparation conditions of the above graph are as follows.

Capillary:
  Material of capillary: ZrO$_2$ (Yttrium partially stabilized, the ratio of Y$_2$O$_3$ to ZrO$_2$ is 5.3 wt %)
  Outer diameter of sintered body: 2.499±0.0005 mm
  Length of sintered body: 10.5 mm
  Length of small diameter straight tube portion: 10.0 mm
  Diameter of small diameter straight tube portion: 125.5 to 126.0 μm
  Machining method of end portion: PC abrasion (spherical surface machining)
Heat-cold-impact cycle:
  Normal temperature→Dropped at the height of 100 mm at 75° C.→Maintained at 75° C. for 30 minutes→Normal temperature→Dropped at the height of 100 mm at −40° Maintained at −40° C. for 30 minutes→Normal temperature is made one cycle.

A controlled value of connection loss of this class is ±0.2 dB. As for 10 samples, 100 cycles test was carried out and as the results, 8 samples are good, but 2 samples started fluctuation in connection loss over 20 cycles and exceeded the controlled value at 30 cycles.

That is, whereas the number of samples is small as n=10, up to 20% of failure was observed so that the conventional connector in which a fiber core line is retained only by a flange can be said to be a structure poor in reliability by the present state adhesive method (adhesive two-pack type epoxy resin 353ND).

Figure 19:
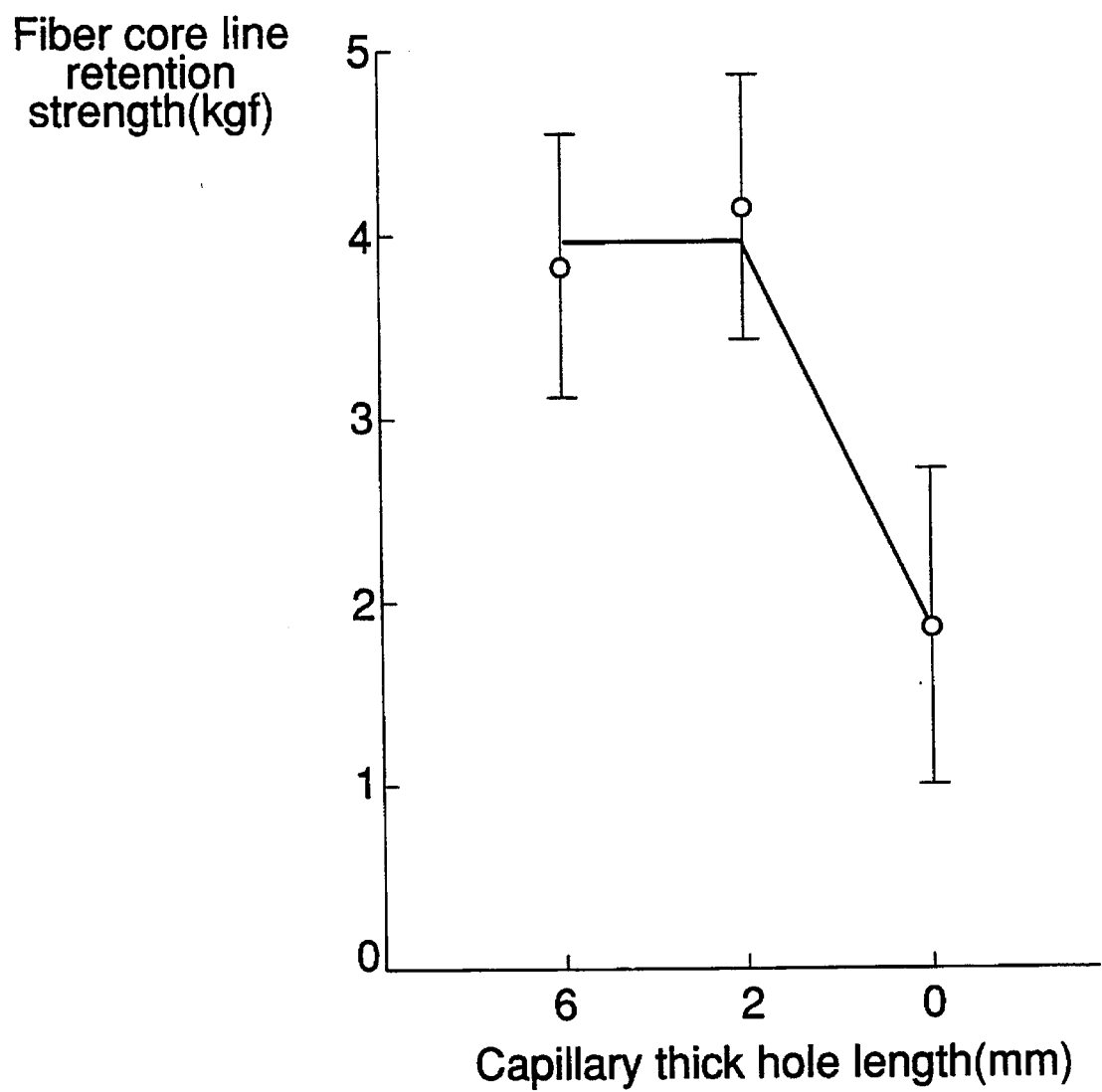
FIG. 19 A graph showing the relationship between a large hole length of a capillary and a retention strength of a fiber bare line.

FIG. 19 is to confirm the circumstances. A tensile test was carried out by fixing only the core line with an adhesive without exposing the bare line to the ferrule. As the results, as for the product in which fixation was carried out only by the ferrule, it had peeled off with 2 kgf or so, whereas the product in which a length of the large hole portion was made 2 mm or more in the capillary for an optical fiber connector in the second embodiment of the present invention, it showed a core line retention strength of 4 kgf or so. Thus, the length of the large hole portion is preferably 2 mm or more.

Figure 9:
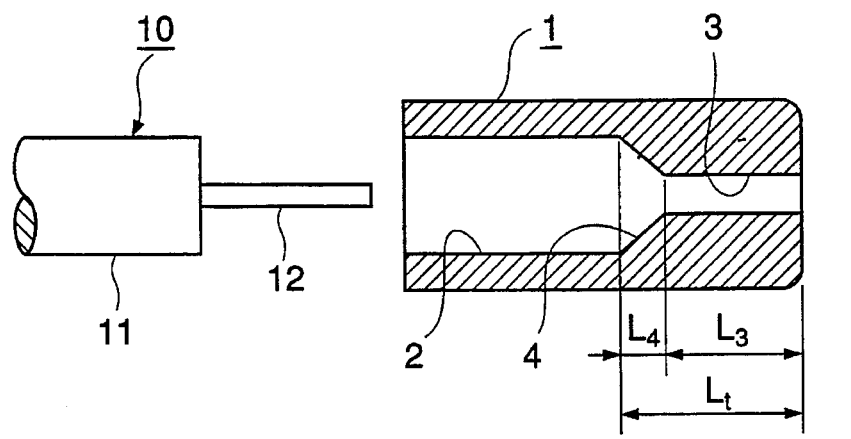
FIG. 9 A drawing schematically showing a capillary for an optical fiber connector according to one example of the second embodiment of the present invention and an optical fiber to be introduced thereinto.

FIG. 9 is a drawing schematically showing a capillary for an optical fiber connector according to one example of the second embodiment of the present invention and an optical fiber to be introduced thereinto. Inside of the capillary 1 for an optical fiber connector, a narrow hole 3, a tapered hole portion 4 and a large hole 2 are formed. In the optical fiber 10, a fiber bare line 12 is exposed from a fiber core line 11. The fiber bare line 12 is inserted into the narrow hole 3 and the tapered hole portion 4 of the capillary 1. The fiber core line 11 is inserted into the large hole 2 of the capillary 1. At the inserted portions, an adhesive (an epoxy resin type, etc.) is adhered for fixation.

A size of the inner diameter of the capillary in Example of FIG. 9 is as follows. Inner diameter of large hole 2: 1.0 to 1.2 mm Inner diameter of narrow hole 3: 125 to 127 μm (single) 126 to 132 (multi)

The length of the narrow hole 3 is made $L_3$, the length of the tapered hole portion 2 is made $L_4$, and the sum of $L_3$ and $L_4$ is made Lt.

Figure 11:
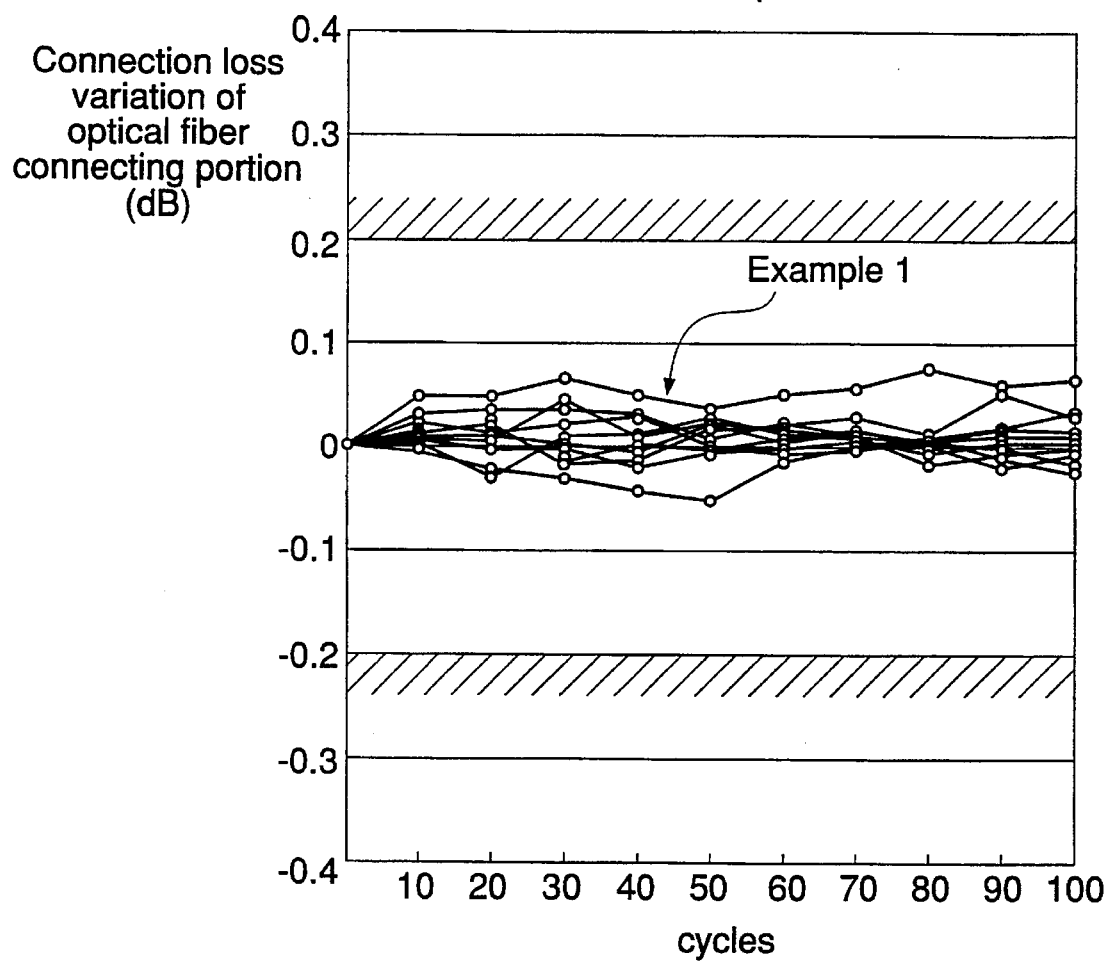
FIG. 11 A graph showing a variation of connection loss at an optical fiber connecting portion prepared by using a ferrule of the present example.

FIG. 11 is a graph showing a variation of connection loss at an optical fiber connecting portion prepared by using a ferrule of the present example, and the transverse axis shows a number of heat-cold-impact cycles and the ordinates axis shows the variation of the connection loss. Preparation conditions of the above graph are as follows.

Figure 12:
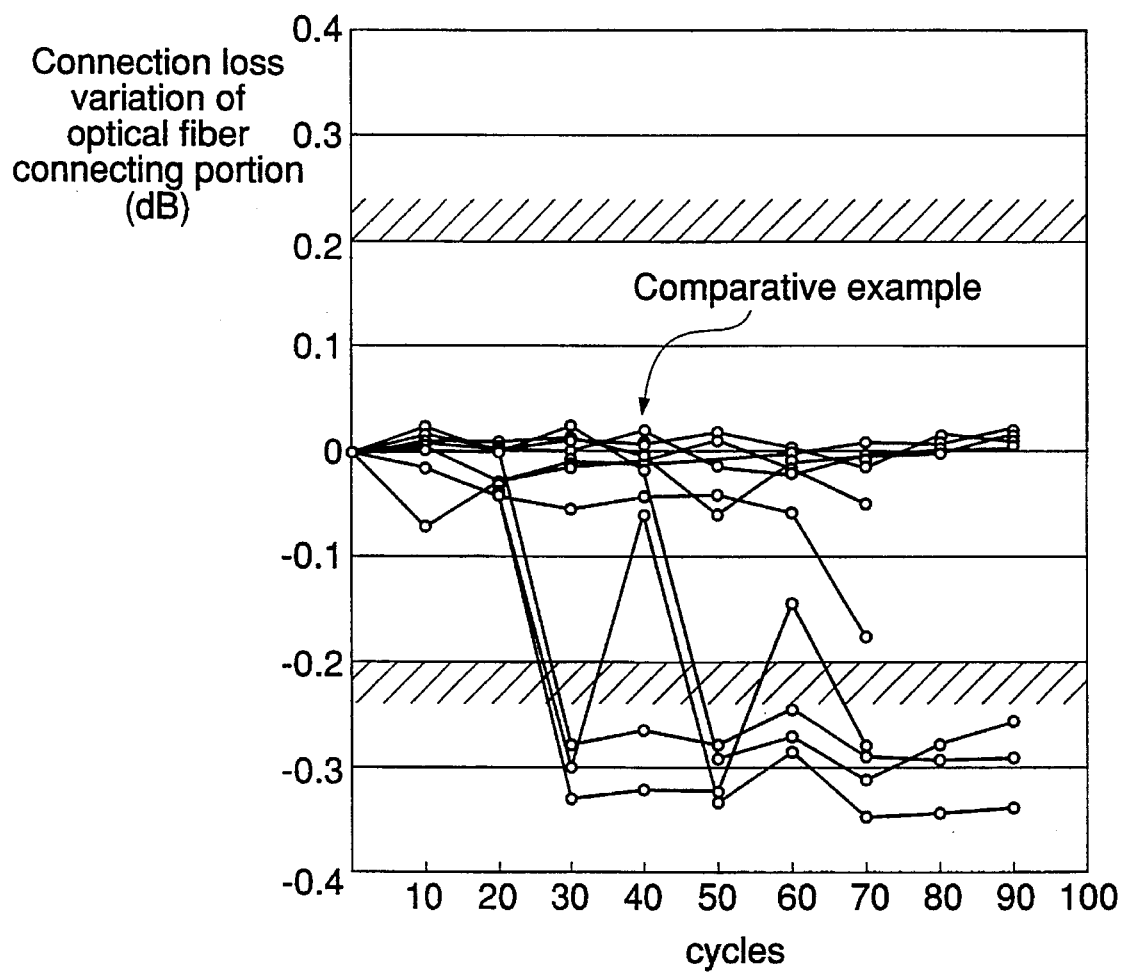
FIG. 12 A graph showing a variation of connection loss at an optical fiber connecting portion prepared by using a ferrule of Comparative example.

Material of capillary: Same as the above conventional example
Outer diameter of sintered body: 2.499±0.0005 mm
Length of sintered body: 10.5 mm
Length of small diameter straight tube portion $L_3$: 6 mm
Diameter of small diameter straight tube portion: 125.5 to 128.5 μm
Length of tapered tube portion $L_4$: 1 mm
Lt: 7 mm
Machining method of end portion: PC abrasion (spherical surface machining)
Heat-cold-impact cycle: Same as the above conventional example In Example, after completion of 100 cycles, all 10 samples are each a variation of the connection loss of within±0.2 dB and thus they are good. FIG. 12 is a graph showing a variation of connection loss at an optical fiber connecting portion prepared by using a ferrule of Comparative example, and the transverse axis shows a number of heat-cold-impact cycles and the ordinates axis shows the variation of the connection loss. Preparation conditions of the above graph are as follows.

Capillary of Comparative example 1:
  Material of capillary: Same as the above conventional example
  Outer diameter of sintered body: 2.499±0.0005 mm
  Length of sintered body: 10.5 mm
  Length of small diameter straight tube portion $L_3$: 3 mm
  Diameter of small diameter straight tube portion: 125.5 to 126.0 μm
  Length of tapered tube portion $L_4$: 1 mm
  Lt: 4 mm
  Machining method of end portion: PC abrasion (spherical surface machining, R20±5 mm)

Heat-cold-impact cycle: Same as the above conventional example.

In this Comparative example, after completion of 70 cycles, among 10 samples, 4 samples exceeded −0.2 dB, and in the remaining 6 samples, even one sample is not good as a tendency. Therefore, when Lt is 4 mm or less, it is not preferred in the point of lifetime.

As for heat-cold-impact cycle test, other examples are tested and the results are shown in Table 2.

TABLE 2

| | $L_t$ | $L_3$ | $L_4$ | Observed results | Judgment |
|---|---|---|---|---|---|
| Example 1 | 5 | 3 | 2 | within 0.1 dB at 50 cycles | O |
| Example 2 | 5.5 | 3 | 2.5 | within 0.08 dB at 50 cycles | O |
| Example 3 | 6 | 3 | 3 | within 0.05 dB at 50 cycles | O |
| Example 4 | 6 | 1 | 5 | within 0.07 dB at 50 cycles | O |
| Example 5 | 7 | 1 | 6 | within 0.07 dB at 50 cycles | O |
| Example 6 | 7 | 3 | 4 | within 0.07 dB at 50 cycles | O |
| Example 7 | 7 | 6 | 1 | within 0.06 dB at 50 cycles | O |
| Example 8 | 8.5 | 6 | 2.5 | within 0.06 dB at 50 cycles | O |
| Comparative example 1 | 4 | 3 | 1 | exceeding 0.3 dB at 30 cycles | X |
| Comparative example 2 | 10.5 | 10.1 | 0.4 | 0.3 dB or more at 50 cycles | X |

In Table 2, variations of respective connection losses are examined by changing Lt from 4 mm to 10.5 mm. In Comparative example 1 (Lt=4 mm), the loss already exceeded 0.3 dB at 30 cycles so that the judgment is X, and in Comparative example 2 (Lt=10.5 mm), the loss is 0.3 dB or more at 50 cycles so that the judgment is X.

Example 1 (Lt=5 mm), Example 2 (Lt=5.5 mm), Examples 3 and 4 (Lt=6 mm), Examples 5, 6 and 7 (Lt=7 mm) and Example 8 (Lt=8.5 mm) are all good and the judgments were O.

Further, since the judgments of any of Example 5 ($L_3$=1 mm), Example 6 ($L_3$=3 mm) and Example 7 ($L_3$=6 mm) which are all Lt=7 mm are O, it can be found that when Lt is 5 to 8.5 mm, good results can be obtained irrespective of L=3 mm or the value of $L_4$.

As the reasons why the variation of the connection loss is restrained at a low level with 5 to 8.5 mm, two reasons can be considered. First, the reason why the results are good when it is 8.5 mm or less is that the large hole portion for retaining the core line can be made 2 mm or more, so that the fiber core line can be certainly retained and it has an impact resistant structure.

Figure 10:
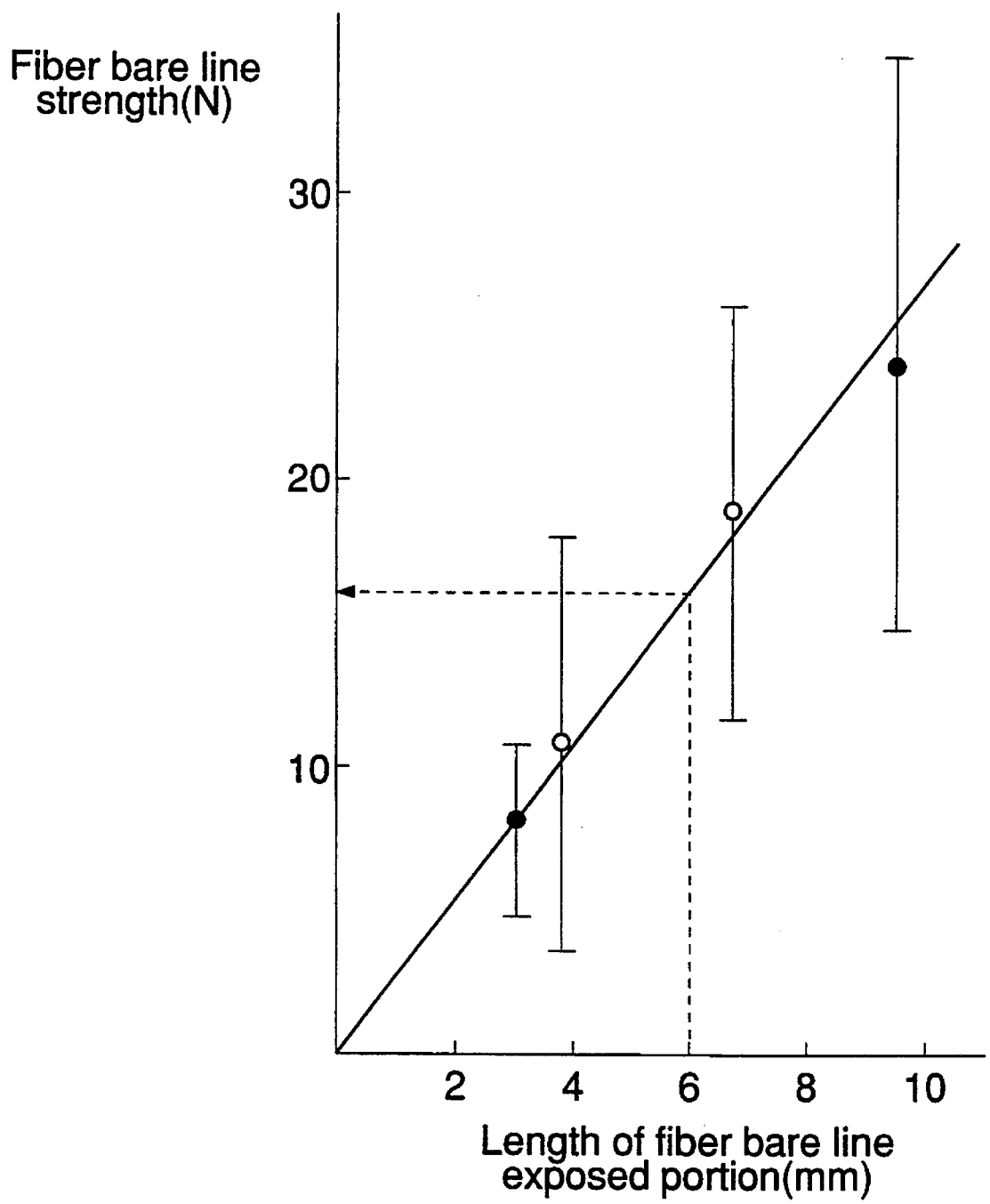
FIG. 10 A graph showing the relationship between a length of a straight tube portion with a small diameter and an adhesion strength of a fiber.

Also, the reason why good results can be obtained when Lt is 5 mm or more is that, as shown in FIG. 10, an adhesion strength of the fiber bare line and the ferrule is proportional to the length of the portion of which the fiber bare line and the ferrule are directly adhered to, and yet inorganic materials are bonded to each other so that thermal deterioration is difficultly generated while an internal stress is occurred due to the thermal cycles. Accordingly, at 4 mm, the adhesion strength is not so large to resist to the internal stress so it involves a problem, but good results can be obtained at 5 mm or more. Further, according to the relationship of FIG. 10, it is more safety when it is made 5.5 mm or more, more preferably 6 mm or more.

Therefore, it can be said that the adhesion strength of the optical fiber relates to the length Lt which is a sum of the length $L_3$ of the small diameter straight tube portion and the length $L_4$ of the tapered tube portion. When the Lt is in the range of 5 to 8.5 mm, more preferably 5.5 to 8.5 mm, further preferably 6 to 8.5 mm, a ceramics capillary which can endure the heat-cold-impact test can be provided. Also, by making the tapered tube portion slightly long, the capillary has a structure which can endure heat-cold-impact even when the small diameter straight tube portion is shortened, has a little deformation in the tube at the injection molding step and a lifetime of the molding pin becomes long.

Figure 13:
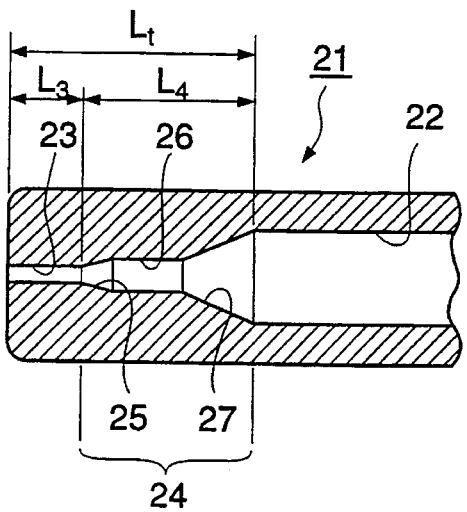
FIG. 13 A sectional view of another example of a ceramics capillary of the present invention.

FIG. 13 is a sectional view of another example of a ceramics capillary of the present invention. In this ceramics capillary 21, a small diameter straight tube portion 23, a tapered tube portion 23 (a tapered tube portion 24 comprises a first tapered tube portion 25, straight tube portion 26 and a second tapered tube portion 27.), and a large diameter straight tube portion 22 are successively provided, and the tapered tube portion 23 and the tapered tube portion 24 contribute to improve adhesion strength, and yet the small diameter straight tube portion 23 can be shortened sufficiently.

That is, the tapered tube portion 24 may be a tapered tube portion containing a small diameter straight tube portion 23 and a large diameter straight tube portion 22 at a tapered portion (in this example, 25 and 27), and there is no problem to contain one or more straight tube portion(s) therein.

Next, by paying attention to the viscosity of the compound for injection molding, the process for preparing a capillary of the present invention which controls the preparation parameter of a capillary for an optical fiber connector is explained.

An angle discrepancy $\theta_{max}$ of a fiber core line is given by the aforesaid Formula (9) as shown below.

$$\theta_{max} = \alpha_{max} + \beta_{max} = \tan^{-1}(6.79wL'^3/d'^4E) + 180(d_c - d_f)/(\pi L) \quad (9)$$

For this Formula, the above Formula (16) which is an experimental formula showing the relationship of w and η is substituted.

$$w = \exp\{-(A \log \eta + B)\} \quad (16)$$

The result is Formula (14) in the single mode and Formula (15) in the multi mode.

$$\tan^{-1}[6.79L^3s^3z^3 \times \exp\{-(A \log \eta + B)\}/d_c^4E] + 180(d_c - d_f)/\pi L \leq 0.1 \quad (14)$$

$$\tan^{-1}[6.79L^3s^3z^3 \times \exp\{-(A \log \eta + B)\}/d_c^4E] + 180(d_c - d_f)/\pi L \leq 0.2 \quad (15)$$

A: Constant
η: Apparent viscosity value of the compound
B: Constant

In these Formulae 14 and 15, as a desirable θ, it is set ≦0.1° for the single mode and ≦0.2° for the multi mode. The relationship of these Formulae is specifically observed.

In order to specifically ascertain the above experimental formula of w, η (apparent viscosity value of the compound) was obtained according to the following manner in the examples of the present invention. The temperature of the compound is made 30° C. lower than the temperature of the compound in a cylinder of the injection molding machine, specifically 120° C. And a load 20 (kgf/mm$^2$) is applied to the compound to pass through a capillary with a diameter of 1 mm×length of 1 mm. A passed amount of the compound per a unit time at the procedure is measured. From the measured value, η was calculated by Newtonian fluid approximation.

Next, the relationship between the η and w was obtained by an experiment with the following conditions. Used ceramics powder: material $ZrO_2$, average grain diameter 0.3 μm, volume ratio 41%.

Binder: Acrylic type resin, average molecular weight 20,000

Molding pin diameter: 0.180 mm

Compound temperature: Cylinder portion 150° C., Cavity portion estimated 120° C.

Injection speed: 5%

Figure 14:
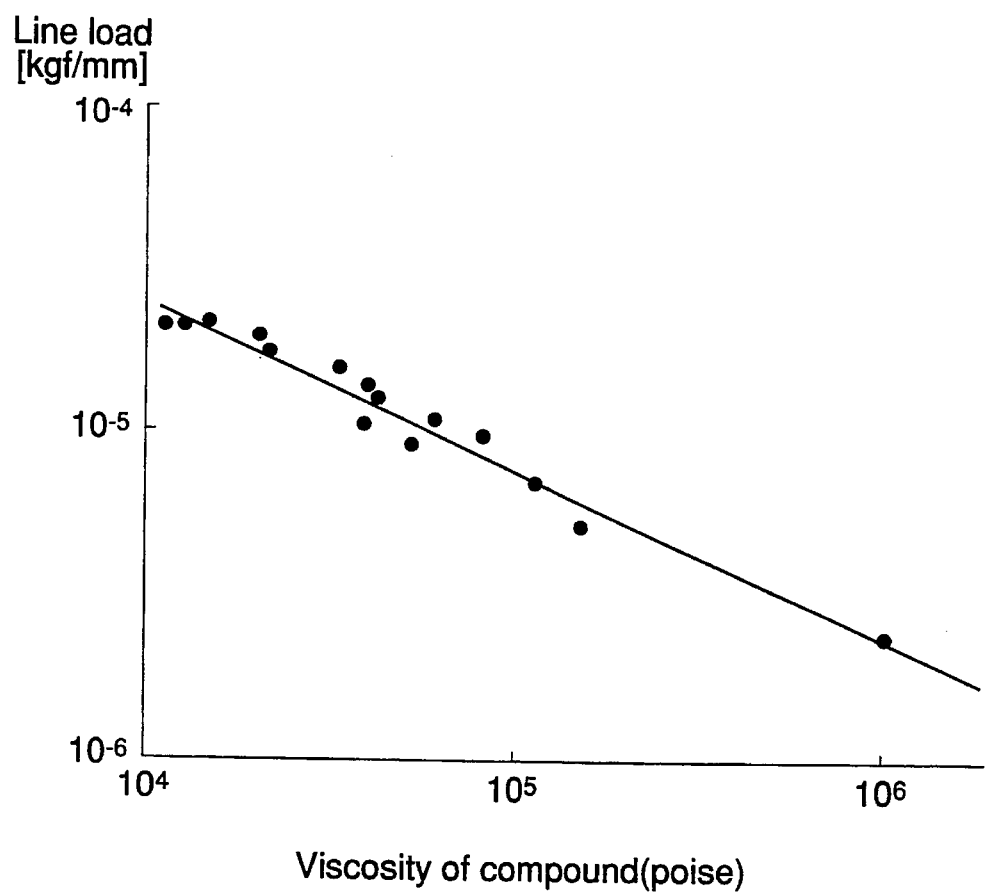
FIG. 14 A graph showing the relationship between a compound viscosity η (poise) and a lateral load w (kgf/mm²) applied to a molding pin.

FIG. 14 is a graph showing the relationship between a compound viscosity η (poise) and a lateral load w (kgf/mm$^2$) applied to a molding pin. In this case, the constants in the above Formula (13) were A=0.46 and B=2.81.

$$w = \exp\{-(0.46 \log \eta + 2.81)\} \quad (15)$$

By using the above formulae, a desired compound viscosity value is obtained.

In the case of the multi mode

Shrinkage factor of the molded body z=0.99,

Young's modulus of the molding pin E=5.31×10$^4$ kg/mm$^2$,

L=10.5 mm, $d_c$=0.1285 mm, $d_f$=0.125 mm,

These values are substituted for the left side, the first term of Formula (12), and by changing the ceramics volume ratio from 0.3 to 0.7 and η from 1×10$^4$ to 1×10$^6$ poise to obtain $\alpha_{max}$. The results are shown in Table 3.

TABLE 3

| Ceramics volume ratio x | Compound viscosity value η | $\alpha_{max}$ | Judgment |
|---|---|---|---|
| 0.3 | 1 × 10$^4$ | 0.45° | X |
| 0.3 | 1 × 10$^5$ | 0.19° | X |
| 0.3 | 1.2 × 10$^5$ | 0.16° | O |
| 0.3 | 1 × 10$^6$ | 0.05° | O |
| 0.4 | 1 × 10$^4$ | 0.49° | X |
| 0.4 | 1 × 10$^5$ | 0.23° | X |
| 0.4 | 1.5 × 10$^5$ | 0.16° | O |
| 0.4 | 1 × 10$^6$ | 0.06° | O |
| 0.5 | 1 × 10$^5$ | 0.24° | X |
| 0.5 | 1.7 × 10$^5$ | 0.16° | O |
| 0.5 | 1 × 10$^6$ | 0.06° | O |
| 0.6 | 1 × 10$^5$ | 0.26° | X |
| 0.6 | 1.9 × 10$^5$ | 0.16° | O |
| 0.6 | 1 × 10$^6$ | 0.07° | O |
| 0.7 | 1 × 10$^5$ | 0.27° | X |
| 0.7 | 2.2 × 10$^5$ | 0.16° | O |
| 0.7 | 1 × 10$^6$ | 0.07° | O |

From this Table 3, when the compound viscosity value η is made η≧2.2×10$^5$ poise, it can be understood that $\alpha_{max}$ can take the desired value $\alpha_{max}$≦0.16° (because $\beta_{max}$ is 0.04° when L=10.5 mm) at L=10.5 mm even when the ceramics volume ratio x may take any value within 0.3≦x≦0.7. Also, as for the more preferred ceramics volume ratio of 0.4≦x ≦0.6 in view of injection moldability, the width of the compound viscosity value η which gives $x_{max}$≦0.16 is spread and it may be η≧1.9×10$^5$ poise.

In the case of the single mode

By making $d_c$=0.127 mm, $d_f$=0.125 mm, L=10.5 mm and others are the same as in the case of the multi mode, calculation was carried out. The results are shown in Table 4.

TABLE 4

| Ceramics volume ratio x | Compound viscosity value η | $\alpha_{max}$ | Judgment |
|---|---|---|---|
| 0.3 | 1 × 10$^5$ | 0.17° | X |
| 0.3 | 4.0 × 10$^5$ | 0.089° | O |
| 0.4 | 1 × 10$^5$ | 0.19° | X |
| 0.4 | 5.0 × 10$^5$ | 0.089° | O |
| 0.5 | 1 × 10$^5$ | 0.20° | X |
| 0.5 | 6.0 × 10$^5$ | 0.089° | O |
| 0.6 | 1 × 10$^5$ | 0.21° | X |
| 0.6 | 6.6 × 10$^5$ | 0.089° | O |
| 0.7 | 1 × 10$^5$ | 0.21° | X |
| 0.7 | 7.2 × 10$^5$ | 0.089° | O |

From this Table 4, when the compound viscosity value η is made η≧7.2×10$^5$ poise, it can be understood that $\alpha_{max}$ can take the desired value $\alpha_{max}$≦0.089° (because $\beta_{max}$ is 0.011° when L =10 mm) at L=10.5 mm even when the ceramics volume ratio x may take any value within 0.3≦x≦0.7. Also, as for the more preferred ceramics volume ratio of 0.4≦x ≦0.6 in view of injection moldability, the width of the compound viscosity value η which gives $x_{max}$≦0.089 is spread and it may be η≧1.9×10$^5$ poise.

As mentioned above, it has been shown that when the compound viscosity value is changed in place of changing the value of the narrow hole length L, bending at forming can be depressed whereby a ferrule which can previously prevent discrepancy of axis at butting in the optical fiber connector.

Next, it will be now shown about the case of justifying the narrow hole length L and the compound viscosity value η simultaneously.

In the case of the multi mode It was made $d_c$=0.1285 mm, and $d_f$=0.125 min.

Figure 15:
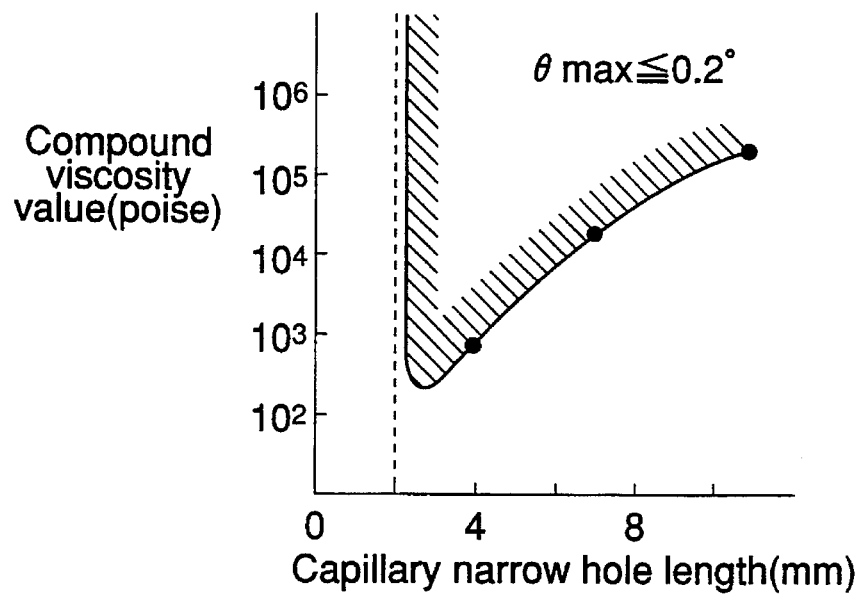
FIG. 15 A graph showing a viscosity value region capable of accomplishing axis discrepancy $\theta_{max} \leq 0.2°$ when a narrow hole length L is changed.

Table 5 shows a range of the viscosity value which accomplishes the axis discrepancy $\theta_{max}$≦0.2° when the narrow hole length L is changed. FIG. 15 is to show the fact with a region on the graph.

TABLE 5

| Narrow hole length L | Maximum oblique angle $\beta_{max}$ | Allowable deflection angle $\alpha_{max}$ | Compound viscosity allowable value η poise | |
|---|---|---|---|---|
| mm | ° | ° | 0.4 ≦ x ≦ 0.6 | 0.3 ≦ x ≦ 0.7 |
| 10.5 | 0.04 | 0.16 | 1.9 × 10$^5$ or more | 2.2 × 10$^5$ or more |
| 7 | 0.06 | 0.14 | 1.5 × 10$^4$ or more | 1.7 × 10$^4$ or more |
| 4 | 0.10 | 0.10 | 8.2 × 10$^2$ or more | 9.3 × 10$^2$ or more |
| 3 | 0.13 | 0.07 | 2.7 × 10$^2$ or more | 3.1 × 10$^2$ or more |
| 2 | 0.20 | — | — | — |

From the results, the following can be understood. First, when L is made small, $\beta_{max}$ becomes large. And L is L<2 true, $\beta_{max}$ becomes $\beta_{max} > 0.2°$. Since $\theta_{max} = \alpha_{max} + \beta_{max}$ and $\alpha_{max} \geq 0$, in this case, $\theta_{max}$ becomes $\theta_{max} > 0.2°$ to any viscosity values whereby axis discrepancy cannot be depressed to the suitable value.

At L>2 mm, when L is made small, $\beta_{max}$ becomes large so that $\alpha_{max}$ allowable value becomes severe. However, from Formula (13), $\alpha_{max}$ is proportional to cube of L so that an allowable range of the viscosity value η in Formula (15) becomes rather broad.

Therefore, in L>2 mm, as L is little, designation of the viscosity conditions becomes easy. In general, the viscosity of the compound when entering into a cavity is suitably $1 \times 10^4$ to $10^5$ poise or so, and when the value exceed the range, Short-Short, etc. are likely caused and molding becomes extremely difficult. Also, the viscosity is too low, bubble, etc. is easily caught up at molding. Selection conditions of a binder are also limited. For such a reason, when injection molding is carried out at 2 L≦9.6 mm which can designate the viscosity conditions to $1 \times 10^4$ to $10^5$ poise, a capillary with less bending can be produced.

In the case of the single mode $d_c = 0.126$ mm $d_f = 0.125$ mm

Figure 16:
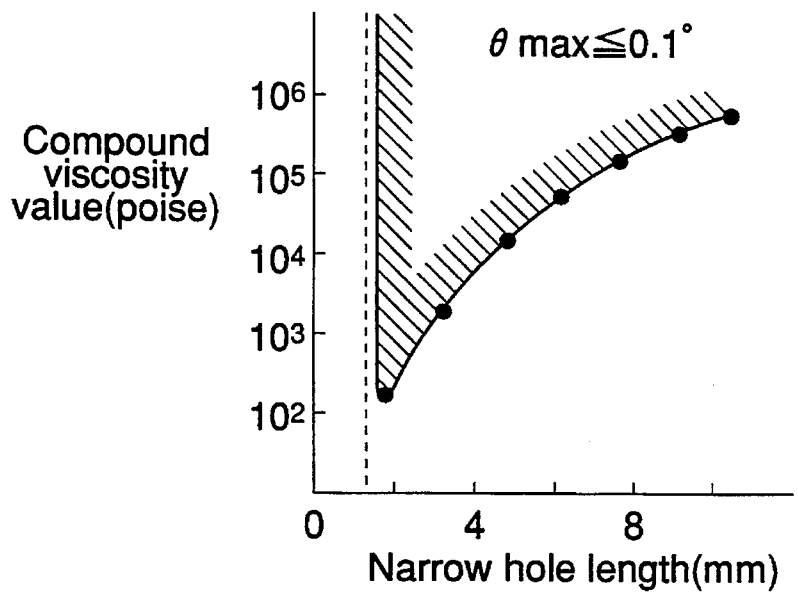
FIG. 16 A graph showing a viscosity value region capable of accomplishing axis discrepancy $\theta_{max} \leq 0.1°$ when a narrow hole length L is changed.

Table 6 shows a range of the viscosity value which accomplishes the axis discrepancy $\theta_{max} \leq 0.1°$ when the narrow hole length L is changed. FIG. 16 is to show the fact with a region on the graph.

TABLE 6

Viscosity conditions satisfying the single mode angle discrepancy regulated value

| Narrow hole length L mm | $\alpha_{max}$ (Regulated value) | Compound viscosity value η poise |
|---|---|---|
| 10.5 | 0.089° | $7.2 \times 10^5$ or more |
| 9 | 0.087° | $3.5 \times 10^5$ or more |
| 7.5 | 0.085° | $1.2 \times 10^5$ or more |
| 6 | 0.080° | $3.2 \times 10^4$ or more |
| 4.5 | 0.074° | $1.4 \times 10^4$ or more |
| 3 | 0.061° | $1.5 \times 10^3$ or more |
| 1.5 | 0.023° | $1.7 \times 10^2$ or more |

From the results, the following can be understood. First, as in the case of the multi mode, when L is made small, $\beta_{max}$ becomes large. And L is L<1.1 mm, $\theta_{max}$ becomes $\beta_{max} > 0.1°$. Thus, in L<1.1 mm, $\theta_{max}$ becomes $\theta_{max} > 0.1°$ to any optional viscosity whereby axis discrepancy cannot be depressed to the suitable value.

At L>1.1 mm, as shown FIG. 16, when L is made small, designation of the viscosity conditions becomes easy. By the same reason as in the case of the multi mode, it is considered that the viscosity setting conditions are suitable $10^4$ to $10^5$ poise, and for the purpose of these, it is preferred to made 1.1<L≦7.2 mm.

Next, viscosity values with compositions in various binder systems, an injection temperature (a cylinder temperature), said temperature −30° C. (estimated cavity temperature) are shown in Table 7.

TABLE 7

| Ceramics volume ratio x | Organic additives constitutional ratio (%) | | | | Ceramic particle diameter (μm) | Injection temperature (°C.) | Viscosity (poise) |
|---|---|---|---|---|---|---|---|
| | Acrylic series | Wax series | Styrene series | Low molecule | | | |
| 0.47 | — | 64.6 | 22.8 | 12.6 | 0.95 | 180 | $5 \times 10^3$ |
| 0.60 | — | 86.9 | — | 13.1 | 0.95 | 110 | $2 \times 10^3$ |
| 0.56 | 89.7 | — | — | 10.3 | 0.95 | 140 | $1 \times 10^4$ |
| 0.40 | 93.7 | — | — | 6.3 | 0.95 | 110 | $4 \times 10^5$ |
| 0.30 | 95.3 | — | — | 4.7 | 0.95 | 100 | $4 \times 10^6$ |
| 0.53 | 66.6 | 14.6 | 12.5 | 6.3 | 0.3 | 150 | $1 \times 10^4$ |
| 0.53 | 72.9 | 25.0 | — | 2.1 | 0.3 | 150 | $6 \times 10^4$ |
| 0.40 | 65.9 | 31.8 | — | 2.3 | 0.3 | 100 | $2 \times 10^4$ |
| 0.53 | 89.7 | — | — | 10.3 | 0.3 | 160 | $1 \times 10^5$ |
| 0.40 | 93.7 | — | — | 6.6 | 0.3 | 120 | $4 \times 10^6$ |
| 0.40 | 66.6 | 31.2 | — | 2.1 | 0.07 | 150 | $1 \times 10^5$ |
| 0.35 | 89.1 | — | — | 8.9 | 0.07 | 160 | $1 \times 10^6$ |
| 0.30 | 93.7 | — | — | 6.3 | 0.07 | 140 | $5 \times 10^6$ |

From Table 7, the following can be understood.

① When the grain size of the ceramics is made small, viscosity becomes extremely high so that the volume ratio of the ceramics must be small. When the viscosity becomes $10^5$ poise or more, there is a fear of generating Short-Short, or the like, and when it exceeds $10^6$ poise, if the molding conditions are not extremely severely adopted, Short-Short had actually occurred.

② For heightening the viscosity value of the compound, it is effective to add a high molecular weight material which exceeds an average molecular weight of 10,000 such as an acrylic series resin with a much amount. Particularly when an acrylic resin is used, there is a tendency that the molding shrinkage factor becomes small as 0.6% or less so that it is more preferred than the other high molecular weight material exceeding an average molecular weight of 10,000 in view of dimensional accuracy.

③ In the case of the single mode, when L=1.5 to 3 mm, any of the compounds shown in Table 7 is used, there is no effect on an angle discrepancy of the fiber bare line. When L=3 mm or more, it is preferred to use a compound comprising an acrylic series resin as a main component. Further, when L=10.5 mm, it is necessary to η≧$7.2 \times 10^5$ poise so that even when ceramics powder having an average grain size of 0.07 μm is used, it is necessary to make the acrylic series resin 80% or more in the binder organic additives.

In the case of the multi mode, when L=2 to 4 mm, any of the compounds shown in Table 7 is used, there is no effect on an angle discrepancy of the fiber bare line. When L=4 mm or more, it is preferred to use a compound comprising an acrylic series resin as a main component. Further, when L=10.5 mm, it is necessary to $\eta \geq 2\times 10^5$ poise so that even when ceramics powder having an average grain size of 0.07 μm is used, it is necessary to take the acrylic series resin 70% or more in the binder organic additives.

An example of representative manufacturing conditions is described.

Capillary shape: Single mode, narrow hole length 3 mm, tapered hole portion 6 mm, whole length 10.5 mm Formulation:
 5.3% by weight of $Y_2O_3$-added $ZrO_2$ powder (average grain diameter 0.07 μm) obtained by the hydrolysis method and a binder were formulated so as to become the volume ratio of the ceramics powder of 40 to 50% by volume. For the binder, an acrylic series resin is mainly used as a molding agent. Also, DBP as a plasticizer and a wax as a lubricating agent are added.

Mixing and kneading:
 The above-mentioned composition was subjected to the steps of mixing at 100° to 150° C., and kneading at 60° to 80° C. were carried out 1 to 5 times to prepare a kneading material.

Granulation:
 The above-mentioned kneading material was granulated by using a pelletizer.

Molding:
 The above-mentioned granulated material was subjected to injection molding at a cylinder temperature of 120° to 160° C., a mold setting temperature of 20° to 40° C., an injection pressure of 900 to 1800 kg/cm$^2$, a dwell pressure application pressure of 180 to 800 kg/cm$^2$, a dwell time of 0.5 to 5 seconds. Other molding conditions are, depending on the kind or the shape of the ceramics, selected from conditions wherein defects such as crack, sink mark, Short-Short, weld, flow mark, etc. are not generated to carry out molding. At that time, it is preferred that the sum of the spure length from the spure to the product portion and the runner length is 50 to 100 mm and the ratio of the diameter of the runner portion and the thickness of the film gate is 1.5 to 5.

Degreasing:
 Degreasing is carried out by using a pressure degreasing furnace. Temperature elevation at degreasing is 180° to 230° C. or so and for gradually decomposing a low molecular weight component(s), the temperature is gradually elevated. Further, at the neighbor of 250° C. at which changes are most remarkable by the TG-DTA curve, the temperature is retained to avoid generation of cracks, craze, voids, etc. The time schedule of the respective steps is different depending on the shape, and in a test piece having a large size, the temperature is elevated for a longer time than that of the capillary.

Sintering:
 Under atmospheric pressure, sintering is carried out at 1300° to 1500° C. for 2 hours. The temperature elevating rate is 50° to 200° C./hr, and when reducing the temperature, it is reduced with 50° to 200° C./hr up to 800° C. and then cooled in a furnace.

As clearly seen from the above explanation, the present invention exhibits the following effects.

①  A capillary for an optical fiber connector which is a low machining cost can be provided.

②  A capillary for an optical fiber connector which is easy for inserting an optical fiber and having no fear of damaging the fiber when insertion can be provided.

③  A capillary having good heat-cold-impact characteristics and impact resistant characteristics can be provided.

We claim:

1. A capillary for an optical fiber connector which comprises, in a capillary used for an optical connector in which tip surfaces of two optical fibers are butted to transmit optical signals between both optical fibers;

a cylindrical ceramics sintered body, having a straight-hole like narrow hole with a slightly larger inner diameter than an outer diameter of said optical fiber bare line for passing the bare line of the optical fiber therethrough, and a tip surface for connection at which the narrow hole opens;

and an inner surface of said narrow hole being substantially a sintered surface.

2. A capillary for an optical fiber connector which comprises, in a capillary comprising a cylindrical ceramics sintered body which is used for an optical connector in which tip surfaces of two optical fibers are butted to transmit optical signals between both optical fibers;

having a straight-hole like narrow hole with a slightly larger inner diameter than an outer diameter of said optical fiber bare line for passing the bare line of the optical fiber therethrough, a tip surface for connection at which the narrow hole opens, a tapered hole portion which elongates gradually tapering and positioned at an opposite side of the tip surface for connection of the narrow hole on the same axis as the narrow hole, and a straight-hole like large hole which is connected with the tapered hole portion on the same axis and for inserting an optical fiber core line therethrough;

and an inner surface of said narrow hole being substantially a sintered surface.

3. A process for producing a capillary for an optical fiber connector comprising a ceramics sintered body provided by a straight-hole like narrow hole for inserting an optical fiber bare line therethrough;

which comprises an injection molding step for obtaining a molded body by subjecting a mixture (compound) of ceramics powder and a binder to an injection molding into a mold provided by a molding pin for forming the above narrow hole, a degreasing step for removing the binder from the molded body, and a sintering step of sintering the degreased molded body to obtain a sintered body;

and the above molding pin has a diameter d" determined by the formula:

$$d''=d_c/(s\cdot z)$$

from a diameter of the above narrow hole $d_c$, a sintering shrinkage factor s, and a shrinkage factor z at cooling solidification of the molded body.

* * * * *